United States Patent [19]

Tanaka et al.

[11] Patent Number: 5,726,967
[45] Date of Patent: Mar. 10, 1998

[54] DISK PLAYBACK APPARATUS FOR A DISK PLAYER

[75] Inventors: Shinsaku Tanaka; Tadao Arata; Akira Iwakiri; Makoto Saeki, all of Tokyo, Japan

[73] Assignee: Tanashin Denki Co., LTD., Tokyo, Japan

[21] Appl. No.: 654,721

[22] Filed: May 29, 1996

Related U.S. Application Data

[63] Continuation of Ser. No. 200,406, Feb. 23, 1994, abandoned.

[30] Foreign Application Priority Data

| Jun. 30, 1993 | [JP] | Japan | 5-187345 |
| Jul. 13, 1993 | [JP] | Japan | 5-195450 |
| Oct. 29, 1993 | [JP] | Japan | 5-294559 |

[51] Int. Cl.$^6$ ............................. G11B 17/10; G11B 17/04
[52] U.S. Cl. ............................. 369/192; 369/178
[58] Field of Search ............................. 369/34, 36, 38, 369/178, 192, 75.2, 77.1, 191

[56] References Cited

U.S. PATENT DOCUMENTS

| 4,654,840 | 3/1987 | Takahashi | 369/75.2 |
| 4,737,945 | 4/1988 | Yamazaki et al. | 369/36 |
| 4,949,328 | 8/1990 | Kase et al. | 369/75.2 |
| 4,979,160 | 12/1990 | Araki | 369/75.2 |
| 5,034,937 | 7/1991 | Caspers et al. | 369/36 |
| 5,123,001 | 6/1992 | Nakamichi et al. | 369/36 |
| 5,177,722 | 1/1993 | Nakamichi et al. | 369/36 |
| 5,274,620 | 12/1993 | Sipos | 369/77.2 |

FOREIGN PATENT DOCUMENTS

| 63-204547 | 8/1988 | Japan | 369/36 |
| 2268308 | 1/1994 | United Kingdom . | |

Primary Examiner—Stuart G. Levy
Assistant Examiner—Brian E. Miller
Attorney, Agent, or Firm—Evenson, McKeown, Edwards & Lenahan, P.L.L.C.

[57] ABSTRACT

A disk playback apparatus comprises a stocker including a plurality of shelves for compact disks, a pallet disposed adjacent to the stocker, a lift stage for moving the stocker up and down so that a selected one of the shelves is located in a position higher than the pallet for a predetermined distance, a loader capable of reciprocating between an unloading position on the stocker side and a loading position on the pallet side, and a lifter in the loader. As the loader moves from the unloading position toward the loading position, the lifter lowers and feeds the disk on the selected shelf to the pallet while drawing out the disk from the stocker. As the loader moves from the loading position toward the unloading position, the lifter raises and returns the disk on the pallet to the selected shelf while pushing back the disk toward the stocker.

6 Claims, 35 Drawing Sheets

DISK PLAYBACK APPARATUS FOR A DISK PLAYER

This application is a continuation of application Ser. No. 08/200,406, filed on Feb. 23, 1994, now abandoned.

BACKGROUND OF THE INVENTION

1. Field of the Invention

The present invention relates to a disk playback apparatus for an optical disk, and more particularly, to a disk playback apparatus furnished with a disk auto-changer.

2. Description of the Related Art

A disk playback apparatus of this type is proposed in the U.S. Ser. No. 07/986,481. The proposed apparatus generally comprises a disk stocker and a disk playback section disposed adjacent thereto. The stocker includes a plurality of shelves, while the playback section is provided with a disk pallet.

Each shelf of the stocker can receive a bare disk without a disk tray thereon, in a manner such that the disk can be drawn out from the shelf. Therefore, the pitch between the shelves can be shortened, so that the stocker can be reduced in thickness.

On the other hand, the pallet of the playback section can receive the disk from the outside of the playback apparatus or from one of the shelves of the stocker.

The following is a brief description of the delivery of the disk from the stocker to the pallet. First, the whole stocker is moved up or down so that a selected one of its shelves is situated in the same level position with the pallet. In this state, the disk on the selected shelf is drawn out to the pallet side, and received by the pallet. When the disk on the pallet is pushed back to the stocker side, thereafter, the disk can be stored on the selected shelf.

In the meantime, the disk received on the pallet is raised together with a turntable to a playback position above the pallet, and is clamped on the turntable in this playback position. When the disk, along with the turntable, is rotated in this state, the disk playback section reads and retrieves information from the disk by means of its pickup.

The peripheral edge of the disk on the pallet or in the playback position partially overlaps a disk stored in the stocker at a vertical distance therefrom. Thus, the overall length of the playback apparatus is reduced to twice the diameter of the disk or less. Since the stocker itself is thin, as mentioned before, moreover, the playback apparatus has a low profile, and the whole playback apparatus is compact.

In the disk playback apparatus described above, the disk in the playback position must be rotated by means of the turntable without touching a disk in the stocker. In consideration of the case where the selected shelf situated on the same level as the pallet is not the top shelf of the stocker, therefore, the playback position should be set between the selected shelf and a shelf directly over it. More specifically, the distance between the pallet and the playback position is limited to about half the pitch of the shelves.

Although the thickness and warp of the disks are restricted within a tolerance, they vary from disk to disk. Depending on the combination of the disks, therefore, the gap between the disk in the playback position and the nearest stored disk on the stocker side may be very narrow. In the worst case, the disk in the playback position may be forced to rotate in contact with one of the disks in the stocker.

Usually, the stocker is an integral plastic product, and its fabrication accuracy cannot be easily stabilized. In some cases, therefore, the spaces between the disks stored individually on the shelves of the stocker may be irregular. If many disks are stored in the stocker, moreover, the stocker itself may be distorted by the weight of the disks. The irregularity of the spaces between the stored disks and the distortion of the stocker result in a reduction of the gap between the disk in the playback position and the nearest stored disk in the stocker, thus causing these two disks to come into contact with each other.

Such an awkward situation can be removed by increasing the pitch of the shelves of the stocker. If this is done, however, the stocker becomes bulkier, and the overall size of the playback apparatus increases.

SUMMARY OF THE INVENTION

The object of the present invention is to provide a disk playback apparatus in which a stocker has a reduced thickness and a disk can be played without touching a disk stored in the stocker.

The above object is achieved by a disk playback apparatus according to the present invention, which comprises: a stocker including a plurality of vertically spaced shelves for individually receiving disks to be played, the stocker allowing the disk to be drawn out from the shelves; raising/lowering means for moving the stocker up and down; a pallet disposed adjacent to the stocker and capable of receiving a disk; loading means for delivering a disk between a selected one of the shelves of the stocker and the pallet in a manner such that the peripheral edge of the disk received on the pallet partially overlaps a disk on a concerned shelf directly over the selected shelf with a vertical space between the disks when the stocker has the concerned shelf; clamp means for raising the disk received on the pallet from the pallet to a playback position and clamping the disk for rotation in the playback position so that a gap is secured between the disk in the playback position and the disk on the concerned shelf; and means for increasing the gap.

In the case where the raising/lowering means locates the selected shelf above the pallet in accordance with the distance between the pallet and the playback position, the gap increasing means includes level changing means for changing the disk level in the process of transfer of the disk between the selected shelf and the pallet by means of the loading means.

Even though the disk fed onto the pallet is raised to the playback position, in this case, the gap between the disk in the playback position and the disk on the concerned shelf of the stocker is sufficiently enlarged. In brief, since the selected shelf is previously located on a higher level than the pallet, the gap between the disk raised from the pallet to the playback position and the disk on the concerned shelf of the stocker can be consequently increased.

In the case where the raising/lowering means locates the selected shelf on the same level with the pallet, on the other hand, the gap increasing means may include lift means for lifting the peripheral edge portion of the disk on the concerned shelf. Also in this case, the gap between the disk in the playback position and the disk on the concerned shelf can be increased.

In the case where the raising/lowering means locates the selected shelf on the same level with the pallet, moreover, the gap increasing means may include another lift means for additionally operating the raising/lowering means, thereby further raising the stocker for a predetermined distance after the disk on the selected shelf is fed onto the pallet. It is evident that the gap between the disk in the playback position and the disk on the concerned shelf can be also increased in this case.

As described above, the gap increasing means may be achieved variously. Due to the increase of the gap, the disks in the playback position and on the concerned shelf can be securely prevented from coming into contact with each other, so that the disk in the playback position can enjoy a stable playback operation.

Since the gap is increased, moreover, the distance between each two adjacent shelves of the stocker can be further shortened, so that the stocker can be thinned, that is, the whole playback apparatus can be made compact.

BRIEF DESCRIPTION OF THE DRAWINGS

The present invention will become more fully understood from the detailed description given herein below and the accompanying drawings which are given by way of illustration only, and thus, are not limitative of the present invention, and wherein.

DETAILED DESCRIPTION OF THE PREFERRED EMBODIMENTS

Figure 1:
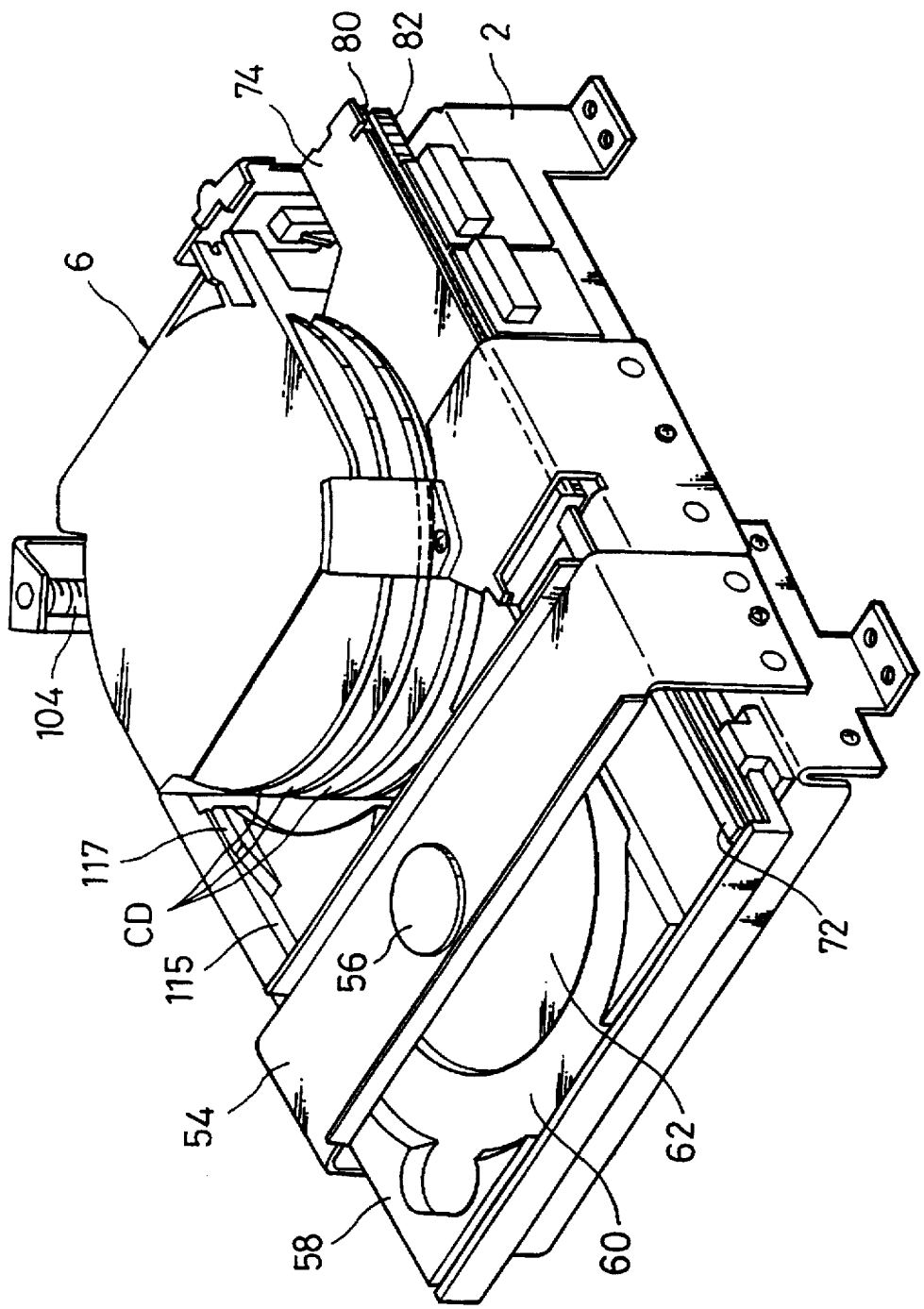
FIG. 1 is a perspective view of a disk playback apparatus.
Figure 2:
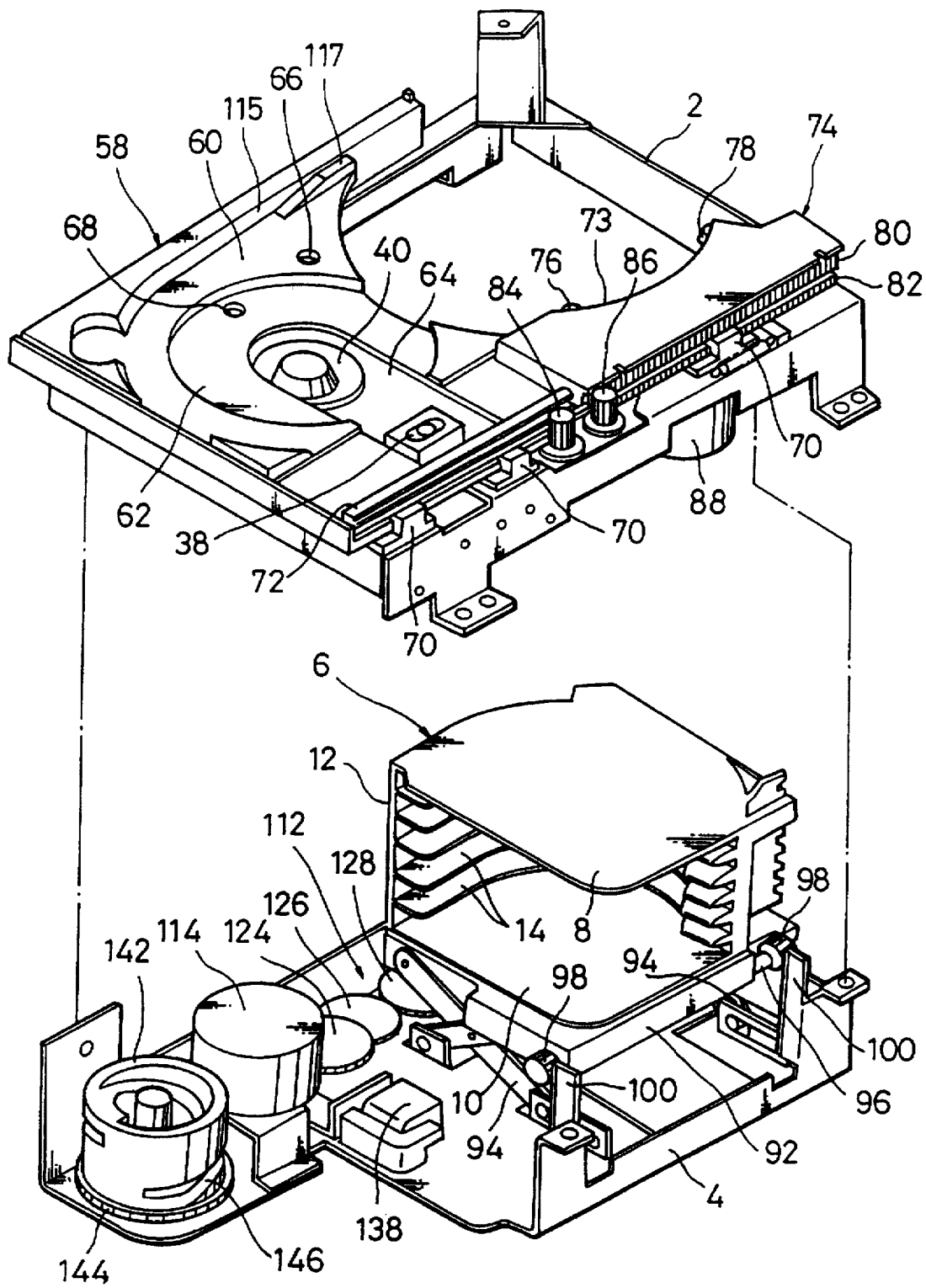
FIG. 2 is an exploded perspective view of the apparatus shown in FIG. 1.

Referring to FIGS. 1 and 2, there is shown a disk playback apparatus which comprises a main chassis 2 and a sub-chassis 4 underlying the main chassis 2. These chassis 2 and 4 are screwed to each other.

A plastic stocker 6 is disposed above the sub-chassis 4. The stocker 6 is situated on one end portion of the sub-chassis 4 or on the deep-side part of the playback apparatus as used, and projects from the main chassis 2 upward.

The stocker 6 is in the form of a box having two open side faces which face the other end and one side edge of the sub-chassis 4. Six shelves 14 are formed on an inner wall 12 of the stocker 6 so as to be spaced vertically. Arcuate channels are defined between the two shelves 14 adjoining to each other, respectively, and extend along the inner wall 12. Preferably, the shelves 14 should be spaced at regular pitches, which is not essential, though.

Each shelf 14 of the stocker 6 can receive an optical disk or a so-called compact disk (hereinafter referred to as CD) with a diameter of 12 cm, for example. As the CD is forced into one of the shelves 14 or the channel from the front side of the stocker 6, it can be held on the shelf. Having the six shelves 14, the stocker 6 can store six CDs in total.

Figure 3:
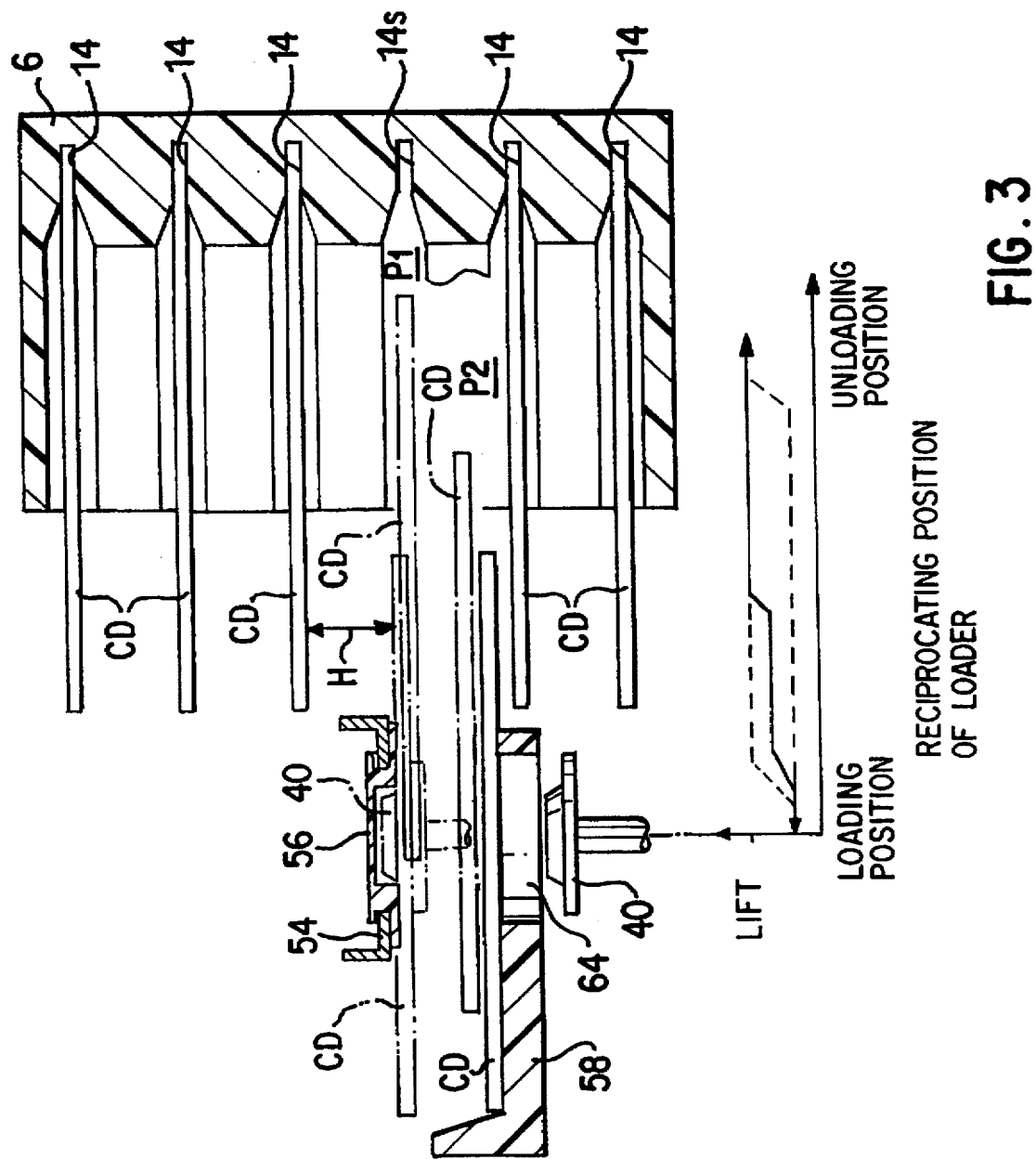
FIG. 3 is a cutaway vertical sectional view of the apparatus.

As seen from FIGS. 1 and 3, each CD is inserted to one of the channels and is held on one of the shelves 14 of the stocker 6 in a manner such that its peripheral edge partially projects from the stocker 6.

A playback unit 20 is provided between the main chassis 2 and the sub-chassis 4. The unit 20 is located on the front side of the stocker 6 in the playback apparatus.

Figure 4:
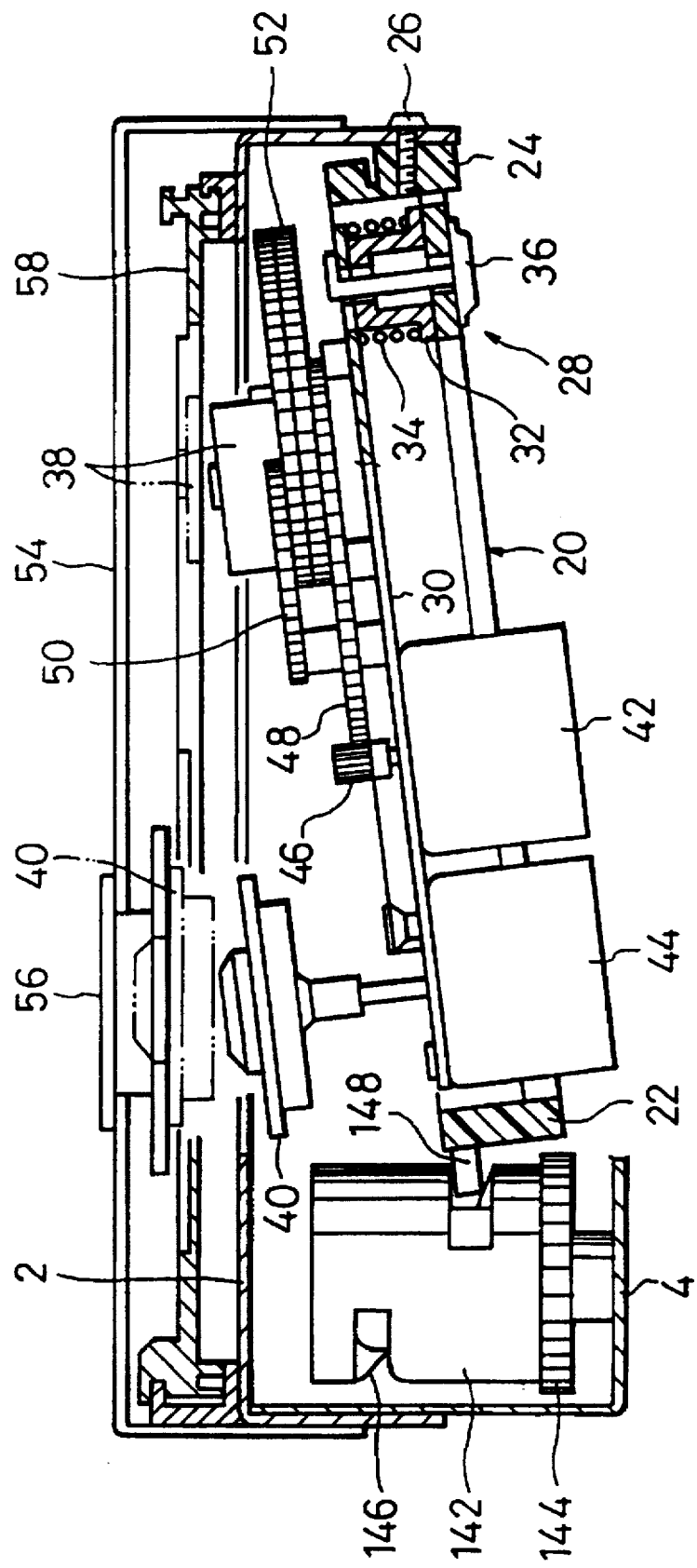
FIG. 4 is a front view of a playback unit of the apparatus.

As shown in FIG. 4, the playback unit 20 is provided with a plastic unit frame 22, which extends across the main chassis 2. A pair of self-hinges 24 (only one of which is shown) are formed integrally on one end of the frame 22. The hinges 24 are connected to the main chassis 2 by means of screws 26. Thus, the other end portion of the unit frame 22 can rock vertically with the aid of the hinges 24.

A unit chassis 30, which is located on the upper surface of the unit frame 22, is supported on the frame 22 through a plurality of spacers 28. The spacers 28 elastically supports the unit chassis 30.

A pickup 38 and a turntable 40 are arranged on the upper side of the unit chassis 30, while a pickup motor 42 for the pickup 38 and a turntable motor 44 for the turntable 40 are mounted on the underside of the chassis 30. The respective output shafts of the motors 42 and 44 project upward through the unit chassis 30.

The turntable 40 is mounted directly on the output shaft of the motor 44, and the pickup 38 and the pickup motor 42 are connected to each other by means of a gear train. This gear train includes an output gear 46 mounted on the output shaft of the motor 42, a pair of stepped gears 48 and 50 successively in mesh with the output gear 46, and a rack 52 in mesh with a small gear of the stepped gear 50. The rack 52 is attached to the pickup 38.

When the output gear 46 is rotated by the pickup motor 42, this rotation is slowed down by the pair of stepped gears 48 and 50, and is converted into a reciprocation of the pickup 38 by means of the rack 52. The pickup 38 reciprocates toward and away from the turntable 40.

As shown in FIG. 2, the stocker 6 is located on an elevating stage 92, and is fixed to the stage 92 by means of screws (not shown). A pair of pantograph-type support legs 94, which are provided between the stage 92 and the sub-chassis 4, support the elevating stage 92 for up-and-down motion. The support legs 94 are arranged individually at front and rear end portions of the stage 92 as in the arrangement shown in FIG. 2.

A horizontal shaft 96 is provided in one side edge portion of the elevating state 92. The shaft 96 horizontally penetrates the stage 92 for rotation, and its opposite ends projects from their corresponding end faces of the stage 92. A pinion 98 is mounted on each projecting end of the horizontal shaft 96. These pinions 98 are individually in mesh with a pair of racks 100. Each rack 100 is formed by raising part of the sub-chassis 4.

Figure 5:
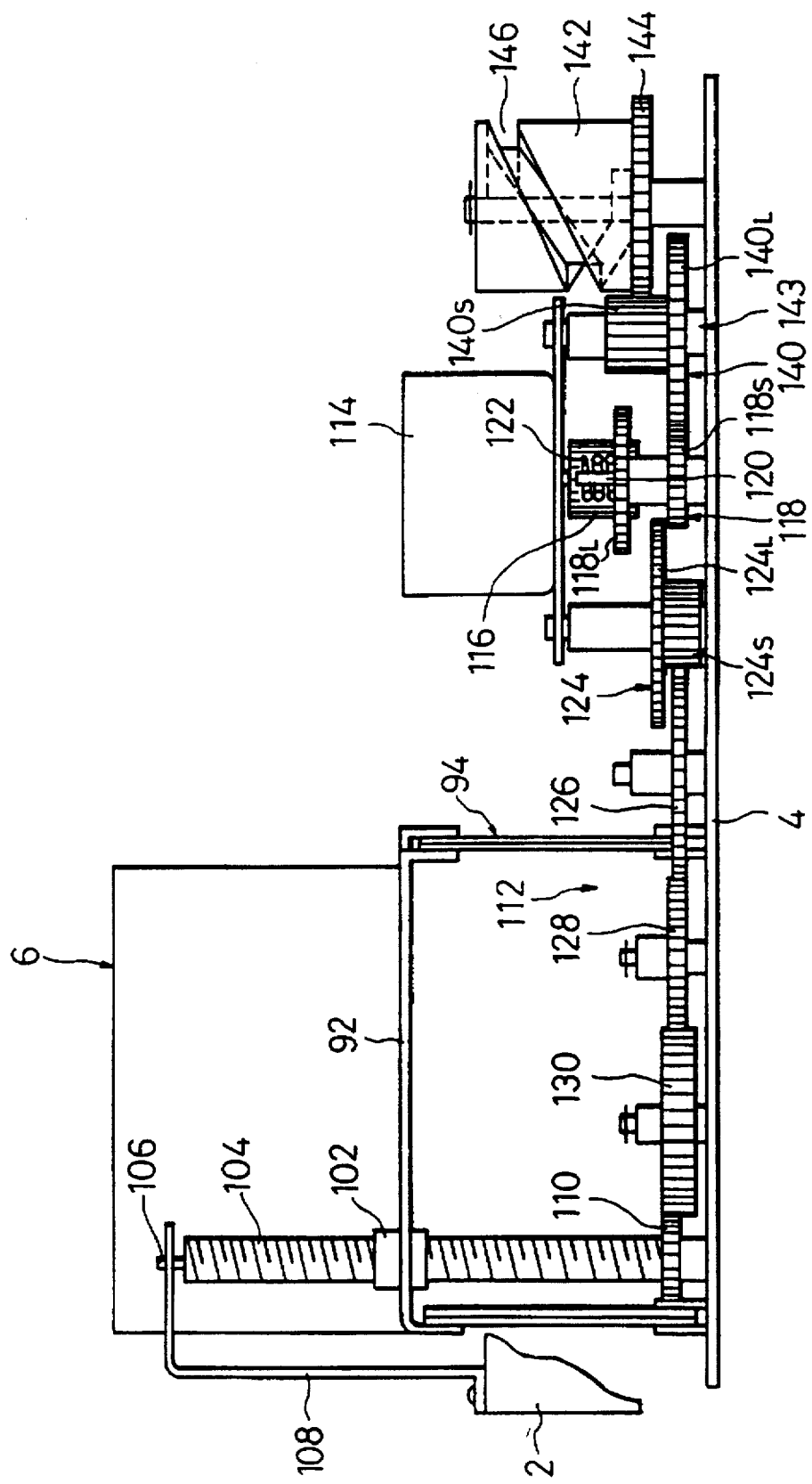
FIG. 5 is a view showing a power transmission system for driving a stocker and the playback unit.

As shown in FIG. 5, a nut 102 is fixed penetrating the other side edge portion of the elevating stage 92. The nut 102 is situated at a rear-side corner of the stage 92. A hollow feed screw 104 is screwed in the nut 102 so as to extend vertically through the nut 102. The screw 104 is penetrated by a post 106. The lower end of the post 106 is supported by the sub-chassis 4, while the upper thereof projects from the feed screw 104. The upper end of the post 106 is supported by a bracket 10, which extends from the main chassis 2.

A gear 110 is mounted on the lower end portion of the feed screw 104, and is connected to a gear train 112. The gear train 112, which extends over the sub-chassis 4, is connectable to a clutch gear assembly 118. The gear assembly 118 includes large and small gears $118_L$ and $118_S$. The large gear $118_L$ can receive power from a motor 114.

More specifically, the motor 114 is mounted on a motor base, which is supported on the sub-chassis 4. The motor 114 has an output shaft, which protrudes downward from the motor base. The output shaft of the motor 114 is fitted with a pinion 116, which has a wide face in the axial direction thereof.

Figure 6:
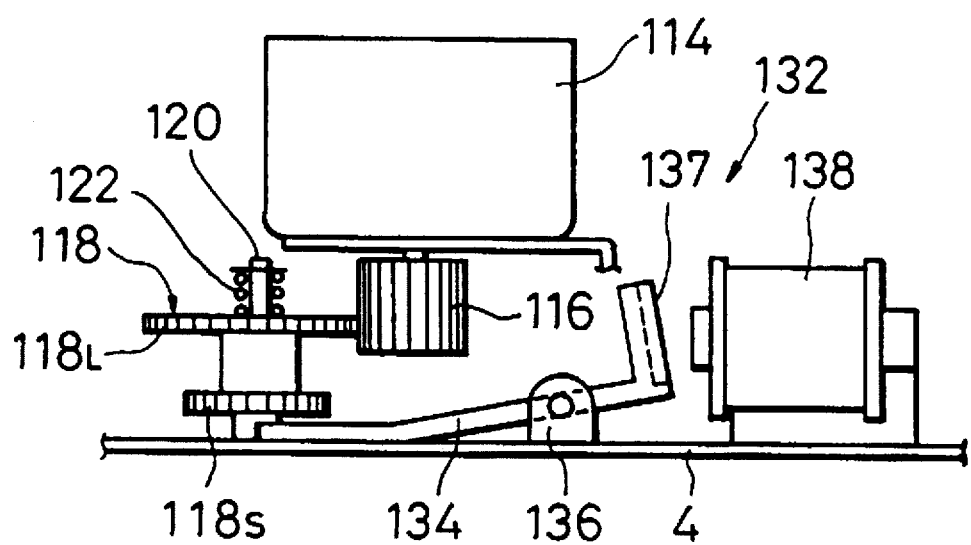
FIG. 6 is a front view showing a clutch actuator of the power transmission system shown in FIG. 5.

As seen from FIG. 6, the pinion 116 is continually in mesh with the large gear $118_L$ of the clutch gear assembly 118, which is rotatably mounted on a support shaft 120. The shaft 120 is set up on the sub-chassis 4, and the gear assembly 118 is vertically movable along the shaft 120 with its larger gear $118_L$ upward. A spring seat is fixed to the upper end of the support shaft 120, and a compression coil spring 122 is interposed between the spring seat and the clutch gear assembly 118. The coil spring 122 continually urges the gear assembly 118 downward, whereby the gear assembly 118 is normally situated in a down position shown in FIG. 5.

A stepped gear assembly 124 is provided at the terminal end of the gear train 112. The stepped gear assembly 124 includes large and small gears $124_L$ and $124_S$. The large gear $124_L$ is situated on the upper side. The small gear $124_S$ of the stepped gear assembly 124 is associated with the gear 110 on the feed screw 104 by means of intermediate gears 126, 128 and 130 of the gear train 112. The gears 124, 126, 128 and 130 are also rotatably supported on their corresponding support shafts, which are set up on the sub-chassis 4.

In the state shown in FIG. 5, the small gear $118_S$ of the clutch gear assembly 118 is not in mesh with the large gear $124_L$ of the stepped gear assembly 124. However, these gears $118_S$ and $124_L$ can be caused to engage each other by means of an actuator unit 132 shown in FIG. 6.

The actuator unit 132 includes a seesaw lever 134, which is rockably supported on a pair of brackets 136. The brackets 136 are mounted on the sub-chassis 4. One end of the seesaw lever 134 is situated under the clutch gear assembly 118, and normally rests on the sub-chassis 4 by gravity. The one end of the lever 134 has the shape of a fork which holds the support shaft 120 of the clutch gear assembly 118 between its prongs. The other end of the seesaw lever 134 is bent upward, and is lifted above the sub-chassis 4.

A magnetic member 137, such as an iron plate, is mounted on the other end of the seesaw lever 134, while an electromagnet 138 is located in the vicinity of the lever 134. The electromagnet 138 faces the other end of the lever 134, that is, the magnetic member 137.

When the electromagnet 138 is energized, it magnetically attracts the other end of the seesaw lever 134, thereby rocking the lever 134 so that its one end ascends. Thereupon, the clutch gear assembly 118 is raised by the seesaw lever 134, so that the small gear $118_S$ of the gear assembly 118 engages the large gear $124_L$ of the stepped gear assembly 124. When the motor 114 is rotated in one direction in this state, its rotatory force is transmitted to the gear 110 on the feed screw 104 through the clutch gear assembly 118 and the gear train 112 in a decelerating manner. As a result, the screw 104 is rotated, and the elevating stage 92 or the stocker 6 is moved up or down, depending on the rotating direction of the screw 104.

When the electromagnet 138 is de-energized, the one end of the seesaw lever 134 and the clutch gear assembly 118 descends by gravity, and the small gear $118_S$ of the clutch gear assembly 118 is disengaged from the large gear $124_L$ of the stepped gear assembly 124.

Referring again to FIG. 5, another gear train 143 extends in the opposite direction to the gear train 112 from the clutch gear assembly 118. A stepped gear assembly 140 is provided at the starting end of the gear train 143. The stepped gear assembly 140, like the aforesaid stepped gear assembly 124, includes large and small gears $140_L$ and $140_S$. In this gear assembly 140, the small gear $140_S$ is situated on the upper side.

When the clutch gear assembly 118 is in the down position, the large gear $140_L$ of the stepped gear assembly 140 is in mesh with the small gear $118_S$ of the gear assembly 118. When the clutch gear assembly 118 is raised by the actuator unit 132, however, its small gear $118_S$ is disengaged from the large gear $140_L$ of the gear assembly 140, and engages the large gear $124_L$ of the stepped gear assembly 124. Normally, the small gear $140_S$ of the stepped gear assembly 140 is in mesh with a gear 144. The gear 144 is formed integrally with a cylindrical cam 142, which has a helical cam groove 146 on its outer peripheral surface. The gear assembly 140 and the cam 142 are rotatably mounted on their corresponding support shafts, which are set up on the sub-chassis 4.

As seen from FIG. 4, the cylindrical cam 142 is situated in the vicinity of the playback unit 20, and more specifically, near that end portion of the unit 20 on the opposite side thereof to the self-hinges 24. A pin-shaped cam follower 148 protrudes from the end portion of the playback unit 20. The follower 148 is fitted in the cam groove 146 of the cylindrical cam 142.

When the motor 114 is rotated with the clutch gear assembly 118 in the down position, that is, with the small gear $118_S$ of the gear assembly 118 in mesh with the large gear $140_L$ of the stepped gear assembly 140, its rotatory force is transmitted to the cylindrical cam 142 through the gear assemblies 118 and 140 and the gear 144 in an decelerating manner. Thereupon, the cam 142 is rotated.

The rotation of the cylindrical cam 142 causes the cam follower 148 of the playback unit 20 to ascend along the cam groove 146. Thus, the playback unit 20 rocks upward from a pause position shown in FIG. 4 around the pair of self-hinges 24, and the pickup 38 and the turntable 40 rise to their respective operating positions indicated by two-dot chain line in FIG. 4.

A circular clamper 56 overlies the playback unit 20 or the turntable 40. The clamper 56 is rotatably mounted on a cross plate 54 with appropriate plays in the horizontal and vertical directions. The cross plate 54 extends .along the playback unit 20 over the main chassis 2. Both ends of the plate 54 is bent downward and fixed to the chassis 2.

The clamper 56 has a lower surface situated below the cross plate 54, and a magnet (not shown) is embedded in part of the lower surface. On the other hand, a magnetic member, such as an iron sheet, is mounted on the upper surface of the turntable 40. Thus, when the turntable 40 is raised to the operating position, as mentioned before, the clamper 56 can clamp the CD between itself and the turntable 40.

Since the cross plate 54 and the clamper 56 never vertically overlap the CDs stored in the stocker 6, there is no possibility of their hindering the ascent and descent of the stocker 6.

Referring again to FIG. 2, a plastic pallet 58 is mounted on the upper surface of the main chassis 2 so as to be sandwiched between the chassis 2 and the cross plate 54.. The distance between the pallet 58 and the clamper 56 is substantially equal to the pitch of the shelves 14 of the stocker 6.

The stocker-side portion of the pallet 58 is cut out so wide that the pallet 58 never interferes with the stocker 6 and the CDs therein. A depression 60 for the CD is formed in the upper surface of the pallet 58, and a depression 62 for a 8-cm compact disk is formed in the center of the depression 60.

Moreover, the pallet 58 is formed having an opening 64, which extends from the center of the depression 62 to the lateral portion of the pallet 58. Thus, the pickup 38 and the turntable 40 can project above the upper surface of the pallet 58 through the opening 64, and the pickup 38 can reciprocate along the opening 64 in a manner such that it projects from the pallet 58.

Preferably, the pallet 58 should be supported on the main chassis 2 for movement in the longitudinal direction of the chassis 2. To attain this, a plurality of guides 70 are arranged at regular intervals on either side edge of the main chassis 2. The guides 70 serve to guide the pallet 58 in movement. Thus, when the pallet 58 on the main chassis 2 is drawn out to the front side of the disk playback apparatus, the depression 60 of the pallet 58 is exposed to the outside of the apparatus.

A guide rail 72 having a T-shaped cross section is formed integrally on one side edge of the pallet 58. The rail 72 extends from the front end of the pallet 58 to the rear end. More specifically, the one side edge of the pallet 58 is left, so that the guide rail 72 extends from the front end side of the main chassis 2 to the rear end side thereof, that is, beyond the playback unit 20 and the stocker 6.

A loader 74 is movably mounted on the guide rail 72. The loader 74 is formed of a plastic plate member, and a rim protrudes integrally downward from the outer periphery of the loader 74. The upper surface of the loader 74 is situated substantially on the same level with the lower surface of the clamper 56.

The loader 74 has an inside edge which faces to the inside of the apparatus. A part of the rim is removed from the central portion of the inside edge of the loader 74. The central portion forms a concave arcuate surface 73 which has a curvature radius greater than the radius of CD. If necessary, a pair of integral protrusions or pushers 76 and 78 are formed individually on the opposite ends of the surface 73. The respective lower ends of the pushers 76 and 78 are tapered upward.

A rack 80 is formed on the outside face of the loader 74, and also, a rack 82 is formed on the rear end portion of the outside face of the pallet 58.

A pair of pinions 84 and 86 protrude upward from the rail-side edge of the main chassis 2. The pinions 84 and 86 are arranged in the central region of the side edge of the chassis 2. These pinions have a face width such that they can engage the rack 80 of the loader 74 and the rack 82 of the pallet 58, and are spaced in the direction of the side edge of the main chassis 2. The pinions 84 and 86 are connected to a loading motor 88 by means of a gear train (not shown), and are rotated in the forward and reverse directions by means of power from the motor 88. The motor 88, which is partially shown in FIG. 2, is mounted on the lower surface of the main chassis 2.

When the loader 74 is situated on the stocker side, that is, in an unloading position, as shown in FIG. 2, the rack 80 of the loader 74 is in mesh with the pinion 86 only, and the rack 82 of the pallet 58 is in mesh with neither of the pinions 84 and 86.

When the paired pinions 84 and 86 are rotated in one direction by the loading motor 88 in this state, the engagement between the rack 80 and the pinion 86 causes the loader 74 to slide on the guide rail 72, from the unloading position toward the front end of the pallet. 58. In the process of this sliding motion, the rack 80 of the loader 74 also engages the other pinion 84.

When the loader 74 reaches one terminal end of the guide rail 72, this arrival is detected by means of a sensor (not shown), and the output of the sensor stops the rotation of the loading motor 88. When this is done, the loader 74 is situated beside the depression 60 of the pallet 58, that is, in a loading position.

When the loading motor 88 is further rotated in the same direction, the loader 74 further slides from the loading position on the guide rail 72, thus abutting against the front end of the pallet 58. As the loader 74 slides in this manner, the pallet 58 is drawn out from a home position on the main chassis 2 shown in FIG. 2. As the pallet 58 goes on being drawn out, its rack 82 engages the pinions 84 and 86 in succession.

When the pallet 58 is drawn out for a predetermined length from the playback apparatus, it is detected by means of a sensor (not shown), and the output of this sensor stops the rotation of the loading motor 88. When this is done, the rack 82 of the pallet 58 is kept in mesh with the pinion 84 only.

If the pallet 58 drawn out from the home position is empty, a new CD can be fed onto the pallet 58. If a CD exists on the pallet 58, on the other hand, it can be removed from the pallet 58.

When the loading motor 88 is rotated in the reverse direction with the loader 74 in the loading position, the loader 74 slides on the guide rail 72, from the loading position toward the unloading position on the stocker side. When the loader 74 reaches the unloading position, this arrival is detected by means of a sensor (not shown), and the output of this sensor stops the rotation of the motor 88. When this is done, the loader 74 is situated in the unloading position.

By thus rotating the loading motor 88 in the forward or reverse direction, the loader 74 can be reciprocated between the unloading position and the loading position.

Figure 7:
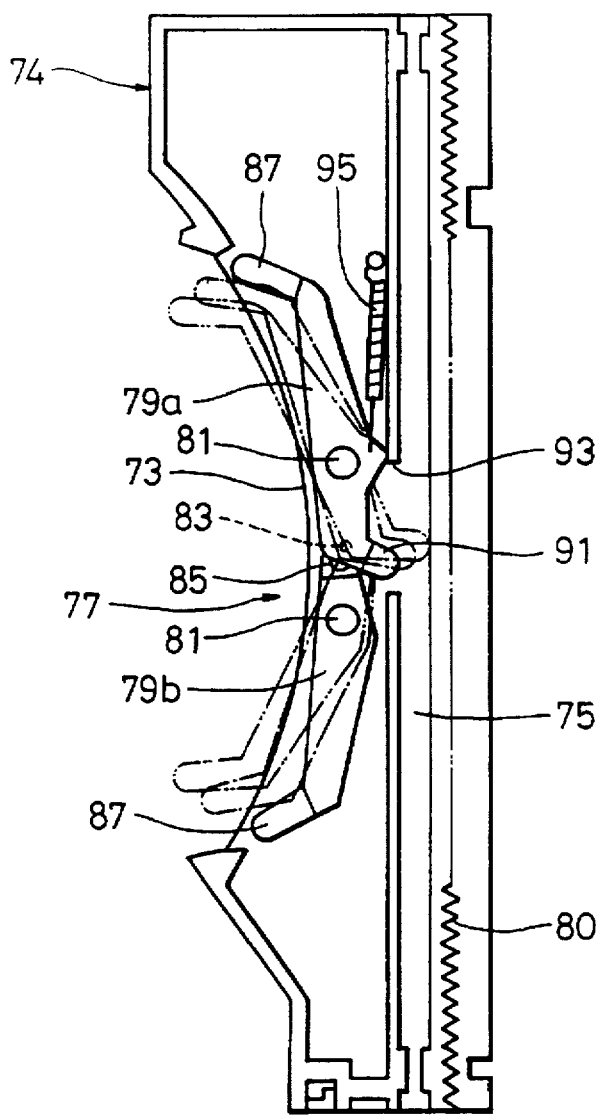
FIG. 7 is a rear view of a loader having a lifter.

Referring to FIG. 7, there is shown the back of the loader 74. The loader 74 includes a lifter 77 besides a rail groove 75 for the guide rail 72. The lifter 77 is located between the groove 75 and the arcuate surface 73.

The lifter 77 is provided with a pair of rotating levers 79a and 79b, which extends in opposite directions along the rail groove 75 from the central region of the loader 74. Each of the levers 79a and 79b has a center pin 81, and is rotatably mounted on the loader 74 by means of the pin 81.

A connecting pin 83 is formed on the proximal end of the one lever 79a, while a slot 85 is formed in the proximal end of the other lever 79b. The pin 83 is fitted in the slot 85 so that the levers 79a and 79b can rotate in opposite directions around their respective center pins 81 and in association with each other.

Figure 8:
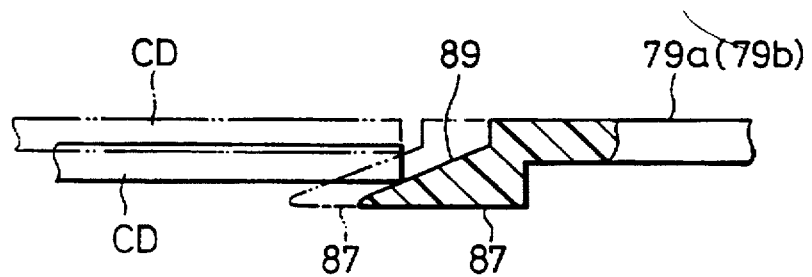
FIG. 8 is a sectional view showing a lifting claw shown in FIG. 7.

A lifting claw 87 is formed integrally on the distal end of each of the levers 79a and 79b. The claws 87 are directed to the arcuate surface 73 of the loader 74. As shown in FIG. 8, the upper surface of each lifting claw 87 forms a slant surface 89 which declines toward the pallet 58.

Further, a lug 91 is formed integrally on the proximal end of the lever 79a. When the lever 79a is rotated in the counterclockwise direction of FIG. 7, the lug 91 can get into the rail groove 75 through an opening 93 therein. The opening 93 is formed in one wall of the groove 75. When the lug 91 is entered in the rail groove 75, the lug 91 is situated on the upper surface of the guide rail 72.

A tension coil spring 95 stretched between the lever 79a and the loader 74. The spring 95 urges the lever 79a in the counterclockwise direction of FIG. 7. Since the lever 79a is connected to the lever 79b in the aforesaid manner, the lever 79b is urged in the clockwise direction through the medium of the lever 79a. When the paired levers 79a and 79b are in a free state, therefore, they are rotated from the positions indicated by full line in FIG. 7 to a first rotating position indicated by two-dot chain line via a second rotating position indicated by dashed line. As the levers are rotated in this manner, their respective lifting claws 87 gradually project from the arcuate surface 73 of the loader 74, while the lug 91 of the lever 79a gradually gets into the rail groove 75.

Figure 9:
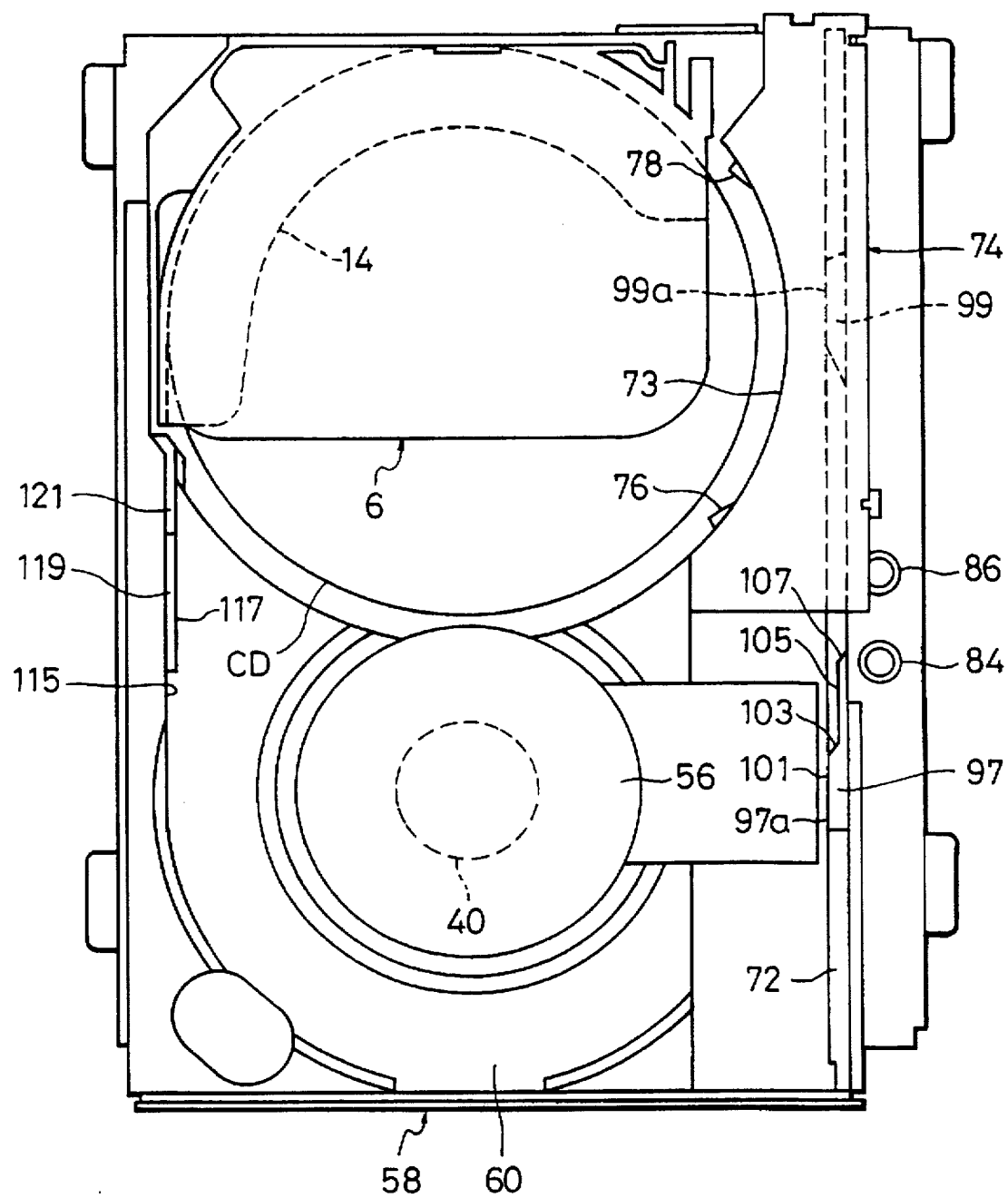
FIG. 9 is a plan view of the apparatus with the loader on the unloading position side.
Figure 10:
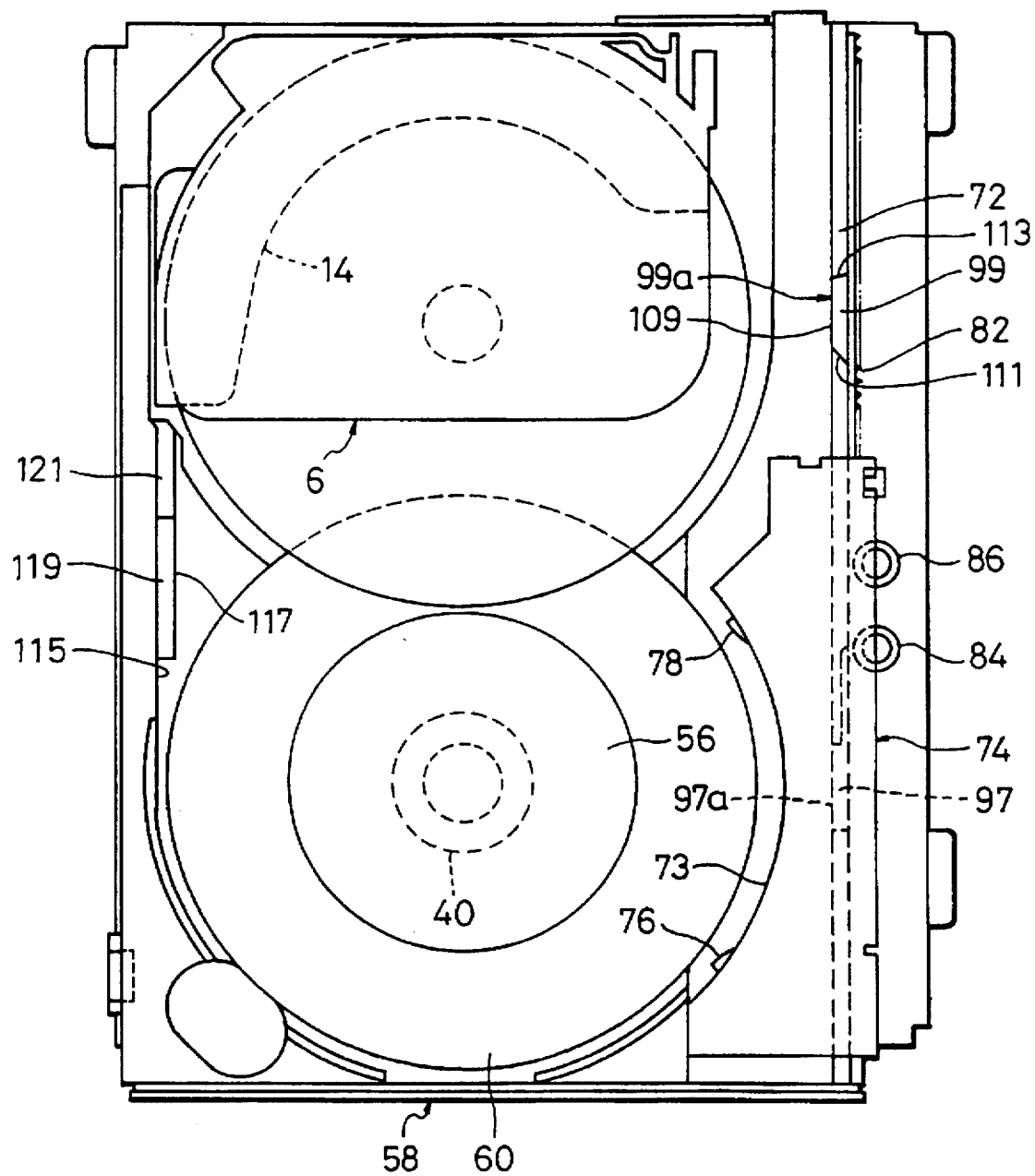
FIG. 10 is a plan view of the apparatus with the loader on the loading position side.

As shown in FIGS. 9 and 10, a pair of relief cams 97 and 98 are formed on the upper surface of the guide rail 72. The cams 97 and 99, in conjunction with the lug 91 of the lever 79a, cause the pair of levers 79a and 79b to rotate in the manner mentioned later.

The one cam 97 is situated on the loading position side of the loader 74, and an inward edge of the cam 97 is formed as a cam profile 97a. The cam profile 97a includes a first parallel portion 101 extending flush with the inside edge of the guide rail 72, an intermediate slant portion 103 extending from the portion 101, a second parallel portion 105 extending from the portion 103 toward the unloading position, and a slant portion 107 extending from the portion 105 to the outside edge of the guide rail 72. A predetermined distance in the width direction of the rail 72 is secured between the first and second parallel portions 101 and 105.

The other cam 99 is situated on the unloading position side of the loader 74, and a stocker-side edge of the cam 99 is formed as a cam profile 99a. The cam profile 99a includes a parallel portion 109 extending flush with the inside edge of the guide rail 72, a first slant portion 111 extending from the portion 109 to the outside edge of the rail 72 on the loading position side, and a second slant portion 113 extending from the portion 109 to the outside edge of the rail 72 on the side opposite to the loading position.

Figure 11:
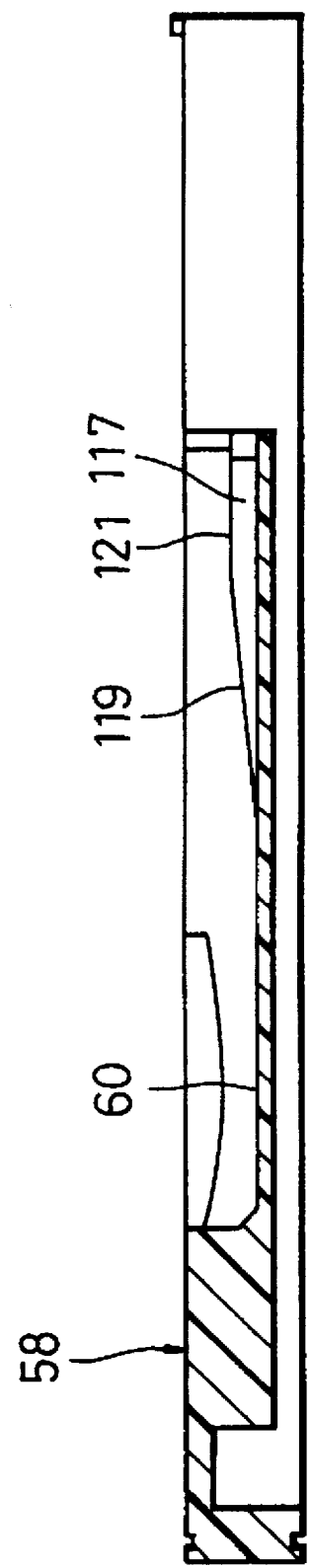
FIG. 11 is a profile of a pallet.

As shown in FIGS. 9 and 10, moreover, the other side edge of the pallet 58 on the side opposite to the guide rail 72 extends from the depression 60 to the lateral portion of the stocker 6, and the inner wall of this side edge is formed as a guide face 115 which is continuous with the inner peripheral wall of the depression 60. A slope 117 is formed along the guide face 115 in that region thereof which is situated near the stocker 6. As seen from FIG. 11, the slope 117 has a slant surface 119, which is inclined upward from the base of the depression 60, and a horizontal surface 121 continuous with the surface 119.

The following is a description of the delivery of the CD between the stocker 6 and the pallet 58.

Let it be supposed that the CDs are stored individually in the shelves 14 of the stocker 6 and that the loader 74 is situated in the unloading position on the stocker side shown in FIG. 9. At this time, the lifter 77 of the loader 74 is in a state such that its lug 91 is on the parallel edge 109 of the cam 99 and is prevented from getting into the rail groove 75. Thus, the lifter 77 or the pair of levers 79a and 79b are rotated to the rest position indicated by solid line in FIG. 7, resisting the urging force of the tension coil spring 95. As seen from FIG. 9, the respective lifting claws 87 of the levers 79a and 79b are hidden in the loader 74.

At this time, on the other hand, the stocker 6 is raised or lowered in the aforesaid manner, and a selected one of its shelves 14 is situated on a level for replacement. The replacement level, which is different from the level of the pallet 58, is adjusted to a position higher than the level of the pallet 58 by a predetermined distance within the range of the pitch of the shelves 14. More specifically, if the selected shelf is the one denoted by reference numeral 14s in FIG. 3, it is positioned so that the CD therein is in a position a little lower than the clamper 56, and that the CD in the shelf 14 directly under the selected shelf 14s is in a position a little lower than the pallet surface of the pallet 58.

When the selected shelf 14s is situated on the replacement level, the lower surface of the CD therein is on the same level with the horizontal surface 121 of the slope 117 (not shown in FIG. 3) of the pallet 58.

When the loader 74 is moved from the unloading position shown in FIG. 9 toward the loading position, in this state, the one pusher 78 of the loader 74 engages the peripheral edge of the CD in the selected shelf 14s, thereby pushing out the CD from the stocker 6. As the loader 74 moves in this manner, the lug 91 of the lifter 77 slides along the edge 99a of the cam 99. When the lug 91 is entirely disengaged from the cam 99 as it slides along the parallel edge 109 and the first slant edge 111 of the cam 99, thereafter, it fully enters the rail groove 75. At this time, the levers 79a and 79b of the lifter 77 are urged to rotate to the operating positions indicated by two-dot chain line in FIG. 7 by the tension coil spring 95, whereupon their respective lifting claws 87 project long from the loader 74.

In this case, the paired lifting claws 87 get under the peripheral edge portion of the CD forced out from the stocker 6, that is, under a first peripheral edge portion of the CD on the loader side, as indicated by two-dot chain line in FIG. 8, so that the first peripheral edge portion of the CD is supported on the respective slant surfaces 89 of the claws 87.

Thus supported on the projecting lifting claws 87, the CD is drawn out from the selected shelf 14s of the stocker 6 as the loader 74 moves. In FIG. 3, the position of the CD in this state is designated by $P_1$.

Figure 12:
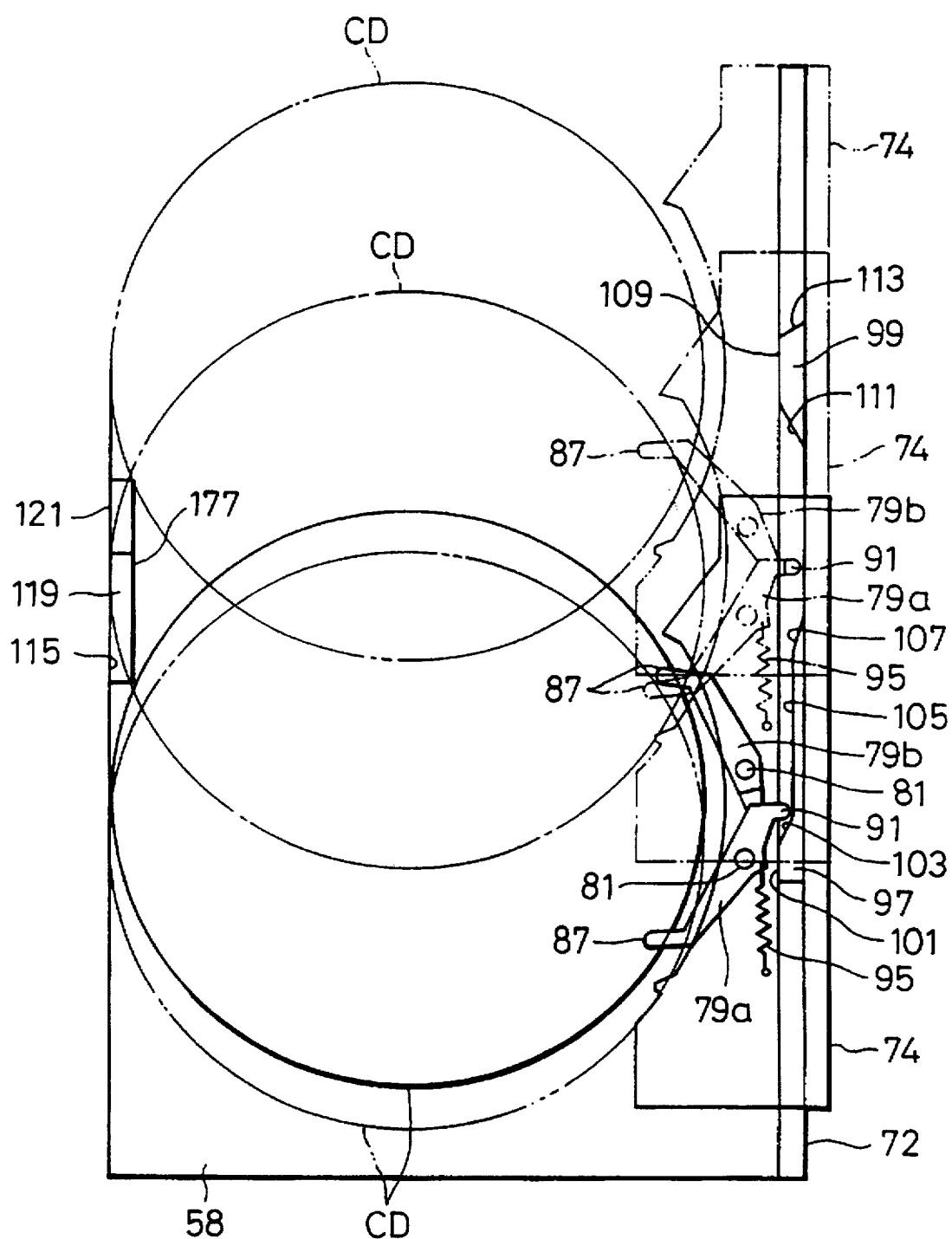
FIG. 12 is a diagram for illustrating the movement of the lifter shown in FIG. 7.

As the CD is drawn out from the stocker 6, its second peripheral edge portion, which is diametrically distant from the first peripheral edge portion of the CD, runs on the horizontal surface 121 of the slope 117 to be supported thereby. Thus, the CD is drawn out from the selected shelf 14s of the stocker 6 while maintaining its horizontal attitude. Although the loader 74 is further moved toward the loading position, thereafter, the pair of lifting claws 87 are kept projecting long from the loader 74. In FIG. 12, the CD and the loader 74 in this state are indicated by dashed line.

In FIG. 12, moreover, the loader 74 in the unloading position and the CD in the stocker 6 are indicated by two-dot chain line, and the CD in the loading position is also indicated by two-dot chain line.

When the loader 74 is further moved toward the loading position, the lug 91 of the lever 79a runs on the edge of the cam 97, that is, runs on the second parallel edge 105 of the cam 97 via the slant edge 107, as indicated by full line in FIG. 12. Thus, the depth of penetration of the lug 91 in the rail groove 75 is reduced, and the pair of levers 79a and 79b of the lifter 77 are rotated in opposite directions. More specifically, the levers 79a and 79b are rotated from the operating positions indicated by two-dot chain line in FIG. 7 to the position indicated by dashed line, resisting the urging force of the tension coil spring 95.

Thereupon, the length of projection of the paired lifting claws 87 from the loader 74 is reduced, as indicated by full line in FIG. 12, so that the claws 87 cause the first peripheral edge portion of the CD to descend along their respective slant surfaces 89. At the same time, the second peripheral edge portion of the CD is disengaged from the horizontal surface 121 of the slope 117, reaches the slant surface 119, and then starts also to descend gradually. As a result, the CD lowers from the position $P_1$ to a position $P_2$ shown in FIG. 3 without changing its horizontal position.

When the loader 74 reaches the loading position, the lug 91 of the lever 91a runs on the first parallel edge 161 of the cam 97 after moving along the second parallel edge 105 and the slant edge 103 of the cam 97, so that the lug 91 is completely prevented from getting into the rail groove 75. Accordingly, the levers 79a and 79b of the lifter 77 rotate to the rest position indicated by full line in FIG. 7, and their respective lifting claws 87 are entirely hidden in the loader 74.

When the loader 74 is situated in the loading position, the first peripheral edge portion of the CD is completely disengaged from the lifting claws 87, and is received by the pallet 58. At the same time, the second peripheral edge portion of the CD is also disengaged from the slope 117, and is received by the pallet 58. In consequence, the CD is placed entire on the pallet 58, as indicated by full line in FIG. 3.

As is evident from the above description, the CD descends for a distance equivalent to the difference in level between the selected shelf 14s of the stocker 6 and the pallet 58 when the CD is drawn out from the shelf 14s onto the pallet 58.

When the loader 74 is moved from the loading position toward the unloading position, thereafter, it pushes back the CD on the pallet 58 toward the stocker 6 by means of its pusher 76. In this process, as is evident from the foregoing description, the CD is raised from the pallet 58 to the level of the selected shelf 14s by the lifter 77 and the slope 117, and is then pushed into the stocker 6 to be held on the selected shelf 14s.

In the lower part of FIG. 3, a full line represents changes of the level of the CD delivered between the selected shelf 14s and the pallet 58.

In the delivery of the CD, its second peripheral edge portion is guided by the guide face 115 of the pallet 58 as it moves between the stocker 6 and the pallet 58.

When the playback unit 20 is rocked upward in the aforesaid manner with the CD on the pallet 58, the CD, along with the turntable 40, is lifted from the pallet 58 to a playback position, and is magnetically clamped between the clamper 56 and the turntable 40, as indicated by two-dot chain line in FIG. 3. As the turntable 40 rotates during playback operation, therefore, the CD is rotated together with the turntable 40, and is played by means of the pickup 38 of the playback unit 20.

When the playback unit 20 is rocked downward after the playback operation is finished, the CD in the playback position is disengaged from the clamper 56, descends together with the turntable 40, and is received by the pallet 58.

When the loader 74 reaches the loading or unloading position, it-is slightly returned, in practice, from the loading or unloading position, as shown in FIGS. 9 and 10. During the following CD clamping operation or stocker raising/lowering operation, therefore, the loader 74 never interferes with the CD.

When the CD is delivered between the stocker 6 and the pallet 58 in this manner, the selected shelf 14s of the stocker 6 is not flush with the pallet surface of the pallet 58, and is previously situated on the replacement level above the pallet 58. Although the CD on the pallet 58 is raised to the playback position for the playback operation, therefore, a satisfactory gap H can be secured between the CD in the playback position and the CD in the shelf 14 directly over the selected shelf 14s.

Even though the individual CDs are subject to substantial errors in accuracy, such as irregular thickness, warp, etc., therefore, there is no possibility of the playback CD in the playback position coming into contact with the CD stored in the stocker 6, so that stable CD playback operation can be maintained.

The gap H between the playback CD and a concerned CD received on the shelf 14 directly over the selected shelf is greater enough than the errors in accuracy. Even though the pitch of the shelves of 14 of the stocker 6 is further reduced, therefore, contact between the playback CD and the concerned CD can be securely prevented. In this case, the stocker 6 can be considerably reduced in thickness, so that the whole playback apparatus can be further improved in compactness.

Figure 13:
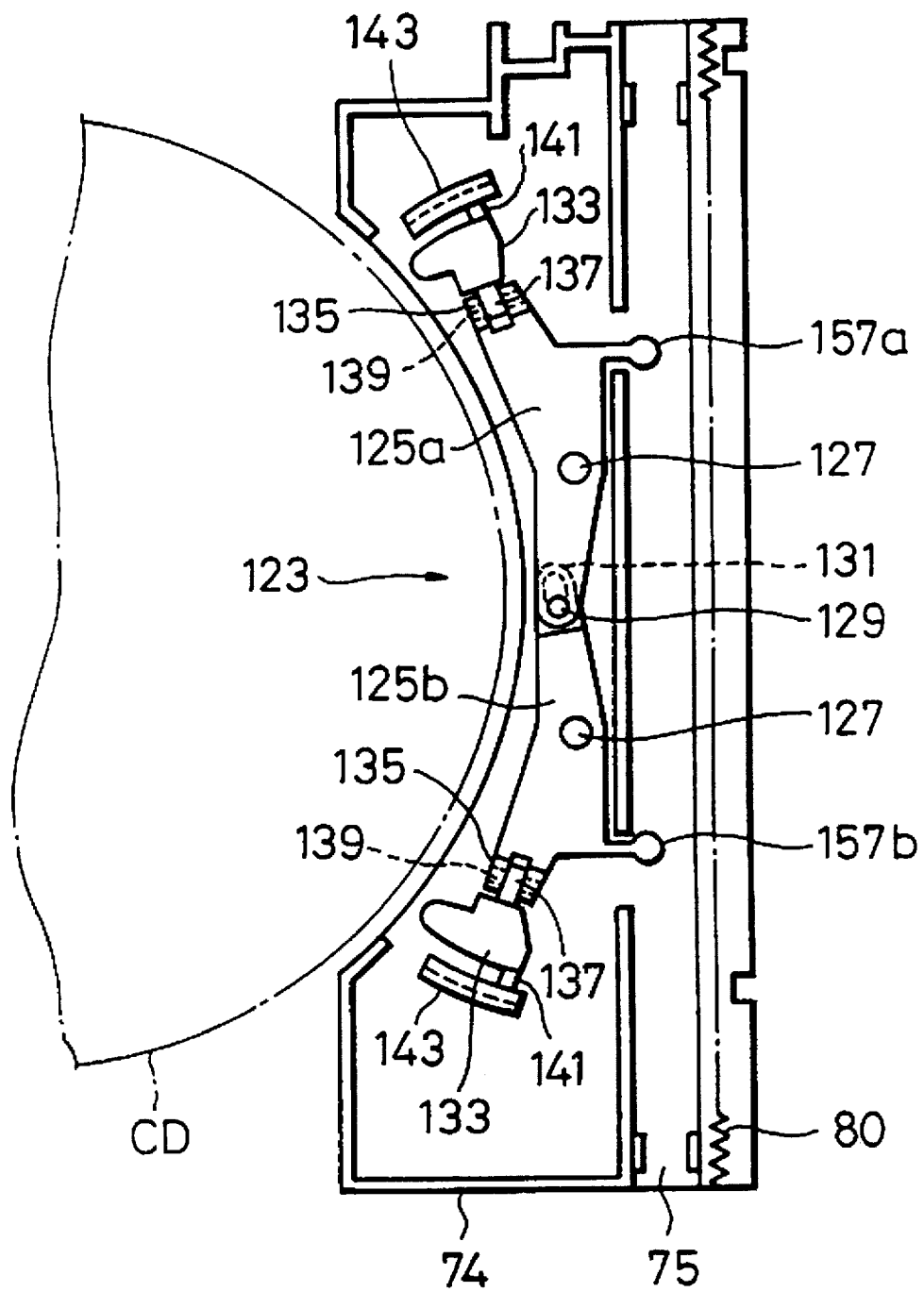
FIG. 13 is a rear view of a loader having another lifter.

Referring now to FIG. 13, there is shown the back of the loader 74 which is provided with a lifter 123 in place of the aforementioned lifter 77. The lifter 123 includes a pair of levers 125a and 125b which resemble the aforementioned pair of levers 79a and 79b. These levers 125 are also rotatably mounted on the loader 74 by means of their respective center pins 127, and their proximal ends are connected to each other by means of a connecting pin 129 and a slot 131.

Lifting claws 133 separate from the levers 125a and 125b are attached individually to the respective distal ends of the levers 125. Each claw 133 is connected to its corresponding lever 125 by means of a hinge.

More specifically, a forked receiver 135 is formed on the distal end of each lever 125. Each lifting claw 133 includes a connecting portion 137 fitted in the receiver 135 and hinge pins 139, which project from both sides of the portion 137 and are rotatably supported by the receiver 135. Thus, each claw 133 is connected to its corresponding lever 125 so that it can rotate toward and away from the back of the loader 74, that is, in the vertical direction.

Further, a guided portion 141 protrudes from each lifting claw 133 on the opposite side thereof to the connecting portion 137. The distal end of each guided portion 141 is in engagement with its corresponding grooved cam 143.

Figure 14:
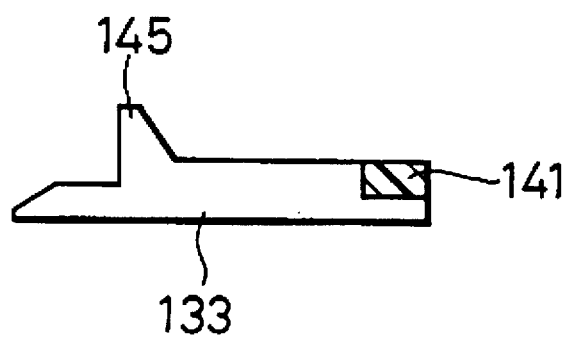
FIG. 14 is a side view showing a lifting claw of the lifter of FIG. 13.
Figure 15:
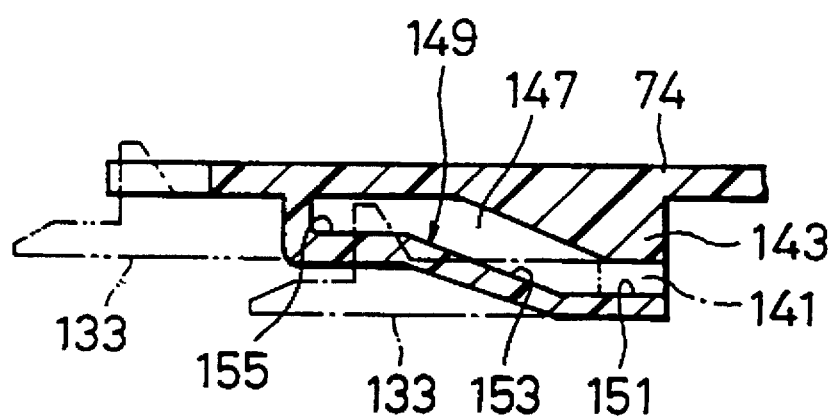
FIG. 15 is a sectional view showing a grooved cam of the loader of FIG. 13.

The details of the lifting claw 133 and the grooved cam 143 are illustrated in FIGS. 14 and 15, respectively. As seen from FIG. 14, a stopper 145 protrudes upward from each lifting claw 133, and the tip of the claw 133 is tapered.

As shown in FIG. 15, on the other hand, each grooved cam 143 is formed integrally on the back of the loader 74. The cam 143 has a cam groove 147 opening to the lifting claw 133. The groove 147 extends along the circumference of an imaginary circle around the center pin 127 of its corresponding lever 125, and the lower wall of the groove 147 is formed as a cam face 149. The face 149 includes a first horizontal portion 151, a slant portion 153, and a second horizontal portion 155, extending from the inner side of the loader 74. The second horizontal portion 155 is situated higher than the first horizontal portion 151 by a distance equivalent to the difference in level between the playback position and the selected shelf 14s.

Referring again to FIG. 13, lugs 157a and 157b protrude integrally from the levers 125a and 125b, respectively. Each lug 157 is situated between the center pin 127 and the receiver 135 of its corresponding lever 115, and its distal end is circular in shape.

Each lug 157, like the aforementioned lug 91, can get into the rail groove 75 through an opening formed in the groove wall of the groove 75.

On the other hand, guide path for the lugs 157a and 157b is formed on the guide rail 72 in place of the cams 97 and 99. The guide path is shown in detail in FIG. 16.

The guide path includes a pair of cross grooves 159a and 159b and another pair of cross grooves 161a and 161b formed on the upper surface of the guide rail 72. The grooves 159a and 159b are located on the unloading position side, and are separated at a predetermined distance from each other. On the other hand, the grooves 161a and 161b are located on the loading position side, and are also separated at a predetermined distance from each other. The distance between the grooves 159a and 159b is equal to the distance between the grooves 161a and 161b.

Further, a longitudinal step 163 is formed on the inside edge of the upper surface of the guide rail 72. As seen from FIG. 16, the step 163 extends from the cross groove 159b to the cross groove 161a. The step 163 is flush with the bottom surfaces of the cross grooves 159 and 161.

Figure 16:
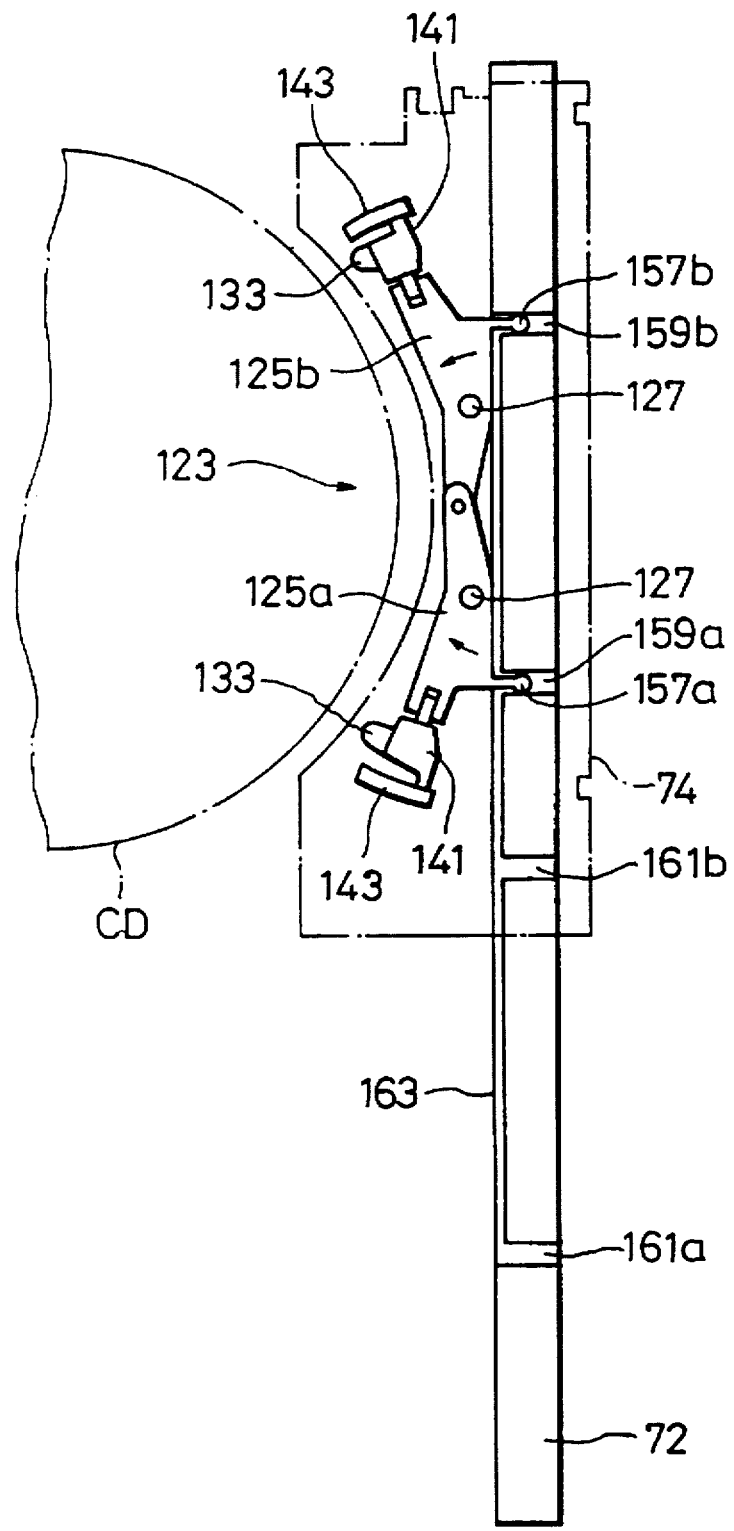
FIG. 16 is a view showing the lifter with the loader of FIG. 13 in the unloading position.

When the loader 74 is in the unloading position, the pair of levers 125a and 125b are in the state shown in FIG. 16. More specifically, the respective distal ends of the lugs 157a and 157b are entirely entered in their corresponding cross grooves 159a and 159b, while the guided portions 141 of the lifting claws 133 are situated on the respective first horizontal surfaces 151 of their corresponding grooved cams 143 (see FIG. 15). In this case, the lifting claws 133 are hidden in the loader When the loader 74 starts to be moved from the unloading position toward the loading position, the respective distal ends of the lugs 157a and 157b are pressed against those groove walls of their corresponding cross grooves 159a and 159b on the unloading position side as in FIG. 16, so that the lugs 157 are prevented from moving toward the loading position. However, these lugs 157 are allowed to move along the groove walls in the cross grooves 159.

As the loader 74 moves, therefore, the pair of levers 125a and 125b are oppositely rotated around their respective center pins 127 in association with each other, as indicated by the arrows in FIG. 16.

Figure 17:
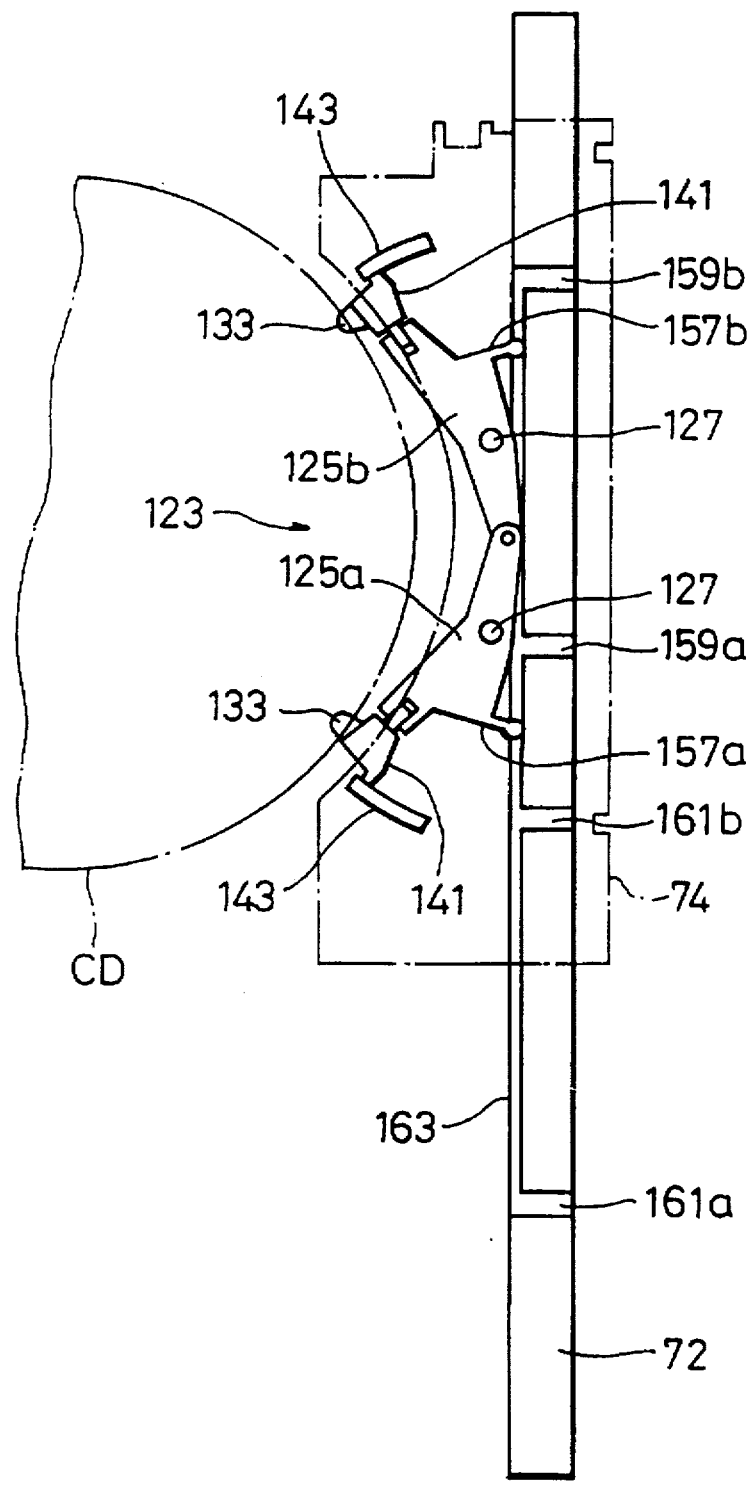
FIG. 17 is a view showing the lifter with the loader of FIG. 13 between the unloading and loading positions.

Thereupon, the pair of lugs 157a and 157b slip out from their corresponding cross grooves 159a and 159b onto the step 163, as shown in FIG. 17.

As the levers 125a and 125b rotate in the aforesaid manner, the pair of lifting claws 133 are moved toward the stocker 6, and their guided portion 141 move on the respective cam faces 149 of their corresponding grooved cams 143. More specifically, each guided portion 141 moves from the first horizontal surface 151 of its corresponding grooved cam 143 to the second horizontal surface 155 via the slant surface 153, whereby it is lifted up. Thus, each lifting claw 133 rotates upward around its hinge pin 139, thereby ascending from the position indicated by dashed line to the position indicated by two-dot chain line, as shown in FIG. 15.

More specifically, the pair of lifting claws 133 are projected from the loader 74 toward the stocker 6 as they are raised to the level of the lower surface of the CD on the selected shelf 14s. As a result, the lifting claws 133, like the aforementioned lifting claws 87, support the peripheral edge portion of the CD on the selected shelf 14s from below, and their respective stoppers 145 are abutted against the peripheral surface of the CD.

When the loader 74 is further moved toward the loading position, thereafter, the respective lugs 157 of the levers 125 move guided by the longitudinal step 163 of the guide rail 72. Even when the lug 157a of the one lever 125a reaches the cross groove 161b, in this process of movement, the lug 157b of the other rocking lever 125b is situated on the step 163, so that the lug 157a of the lever 125a can never fall into the cross groove 161b.

Thus, the pair of levers 125 move toward the loading position without changing its rotating attitude shown in FIG. 17.

Even when the lug 157b of the lever 125b reaches the cross groove 159a, thereafter, the lug 157a of the lever 125a is situated on the step 163. Also in this case, therefore, the pair of levers 125 move toward the loading position without changing the rotating attitude shown in FIG. 17, and the lug 157b can never fall into the cross groove 159a.

Figure 18:
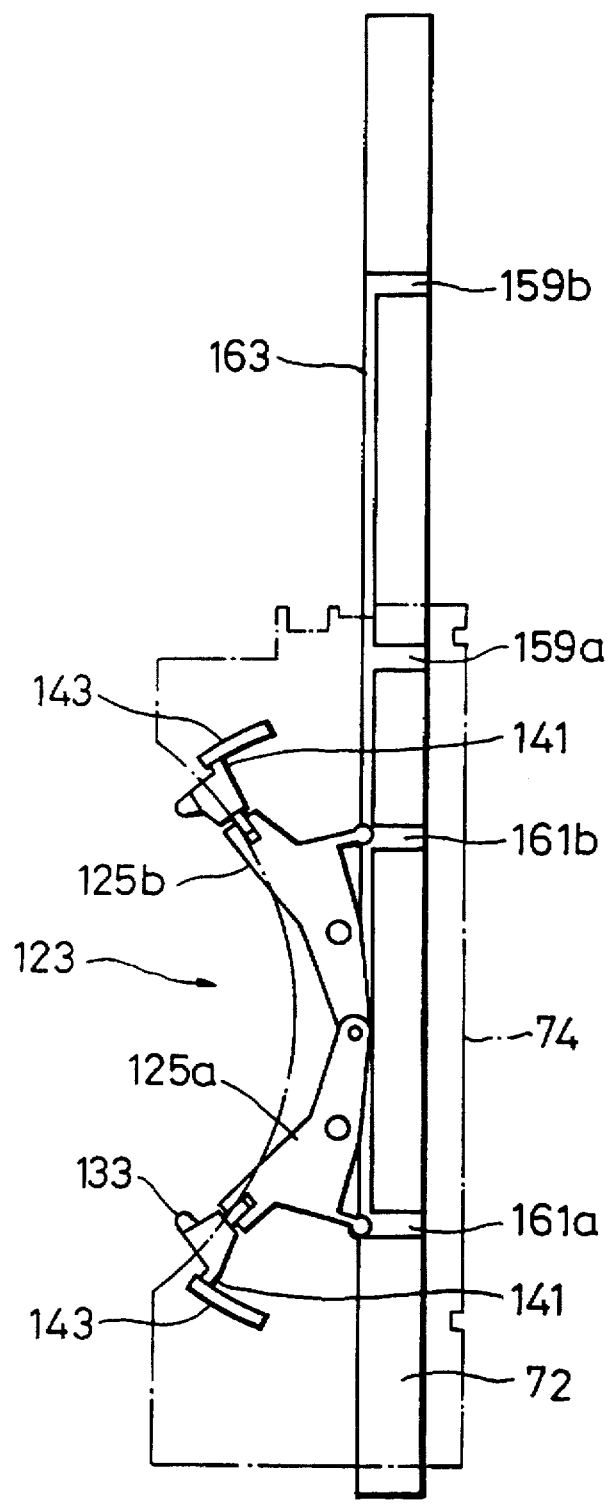
FIG. 18 is a view showing the lifter with the loader of FIG. 13 on the edge of reaching the loading position.

When the loader 74 reaches a position near the loading position, as shown in FIG. 18, the lug 157a of the lever 125a abuts against one terminal end of the step 163, that is, the groove wall of the cross groove 161a, so that it is prevented from moving along the guide rail 72. At this time, the lug 157b of the other lever 125b reaches the cross groove 161b.

When the loader 74 is further moved from this position to the loading position, the lever 125a rotates in the counterclockwise direction of FIG. 18 in a manner such that its lug 157a gets into the cross groove 161a, since the lug 157a is prevented from moving along the guide rail 72. At the same time, the lever 125b rotates in the clockwise direction in a manner such that its lug 157b gets into the cross groove 161b.

As a result, the pair of levers 125 are restored to the same rest attitude as the one shown in FIG. 16. As the levers 125 are restored in this manner, the guided portion 141 of each lifting claw 133 moves from the second horizontal surface 155 of its corresponding grooved cam 143 onto the first horizontal surface 151 via the slant surface 153. Thus, the pair of lifting claws 133 return to the inside of the loader 74 while rotating downward around their respective hinge pins 139.

The pair of lifting claws 133 of the lifter 123 not only support the CD, but also can hold the CD between them. When the claws 133 are rotated upward, they are inclined, so that the peripheral edge portion of the CD is held between the pair of lifting claws 133. Thus, the lifting claws 133 also have the function of the aforementioned pushers 76 and 78. As the loader 74 moves, the CD in the selected shelf 14s is drawn out from the stocker 6 toward the pallet 58 in a manner such that it is supported by the claws 133.

When the loader 74 reaches the loading position, the pair of lifting claws 133 return to the inside of the loader 74. Thereupon, the CD is released from the claws 133 and placed on the pallet 58.

Also in the case of this second embodiment, the pallet 58 is provided with the slope 117, which guides the second peripheral edge portion of the CD when the CD is drawn out from the stocker 6.

When the loader 74 moves from the loading position to the unloading position, on the other hand, the lifting claws 133 and the slope 117 act oppositely to the aforesaid case, with respect to the CD. More specifically, when the loader 74 is moved to the unloading position, the CD is raised to the level of the selected shelf 14s of the stocker 6 in a manner such that it is moved from the pallet 58 toward the stocker 6, and is then pushed back toward the shelf 14s. In the graph of FIG. 3, broken-line curves represent the level change characteristics of the CD provided by the action of the lifter 123 or the lifting claws 133.

The lifter 123 of the second embodiment has the following advantages as well as the same effect of the lifter 77 according to the first embodiment.

First, although the lifter 77 requires use of the tension coil spring 95 for urging the levers 79a and 79b to rotate, the lifter 123 does not.

Secondly, each lifting claw 133 of the lifter 123 is rotated upward along the cam face 149 of its corresponding grooved cam 143. Even though the length of projection of the claws 133 from the loader 74 is short, therefore, a substantial lift can be secured for the claws 133.

Thirdly, the pair of levers 79 of the lifter 77 sometimes may rotate against the urging force of the tension coil spring 95 if the CD is unexpectedly subjected to a load during transportation. In such a case, the lifting claws 87 of the levers 79 cannot support the CD any longer, possibly causing the CD to drop. Even though the CD is subjected to an unexpected load, however, the levers 125 of the lifter 123 can never be rotated, so that the CD can be transported with stability.

Fourthly, the pair of lifting claws 133 of the lifter 123 draw out or push back the CD from or toward the stocker 6 by themselves. Therefore, the loader 74 need not be moved back after it is situated in the unloading or loading position. Thus, when the loader 74 is in the unloading or loading position, the lifting claws 133 of the lifter 123 are already in the loader 74, so that they can never interfere with the CD on the pallet 58 or any of the CDs stored in the stocker 6. In consequence, the reciprocation of the loader 74 of the second embodiment can be controlled more easily than that of the first embodiment.

According to the disk playback apparatus described above, the selected shelf 14 of the stocker 6 is situated in the replacement level above the pallet 58, and the CD is delivered between the shelf 14s and the pallet 58 in this state. Thus, the playback CD and the concerned CD on the shelf 14 directly over the selected shelf 14s are prevented from coming into contact with one another during the playback operation.

According to a disk playback apparatus which will be described below, however, the CD is delivered between the stocker 6 and the pallet 58 in a manner such that the selected shelf 14 is situated on the same level with the pallet 58 and the playback CD is prevented from coming into contact with the concerned CD on the stocker side.

Figure 19:
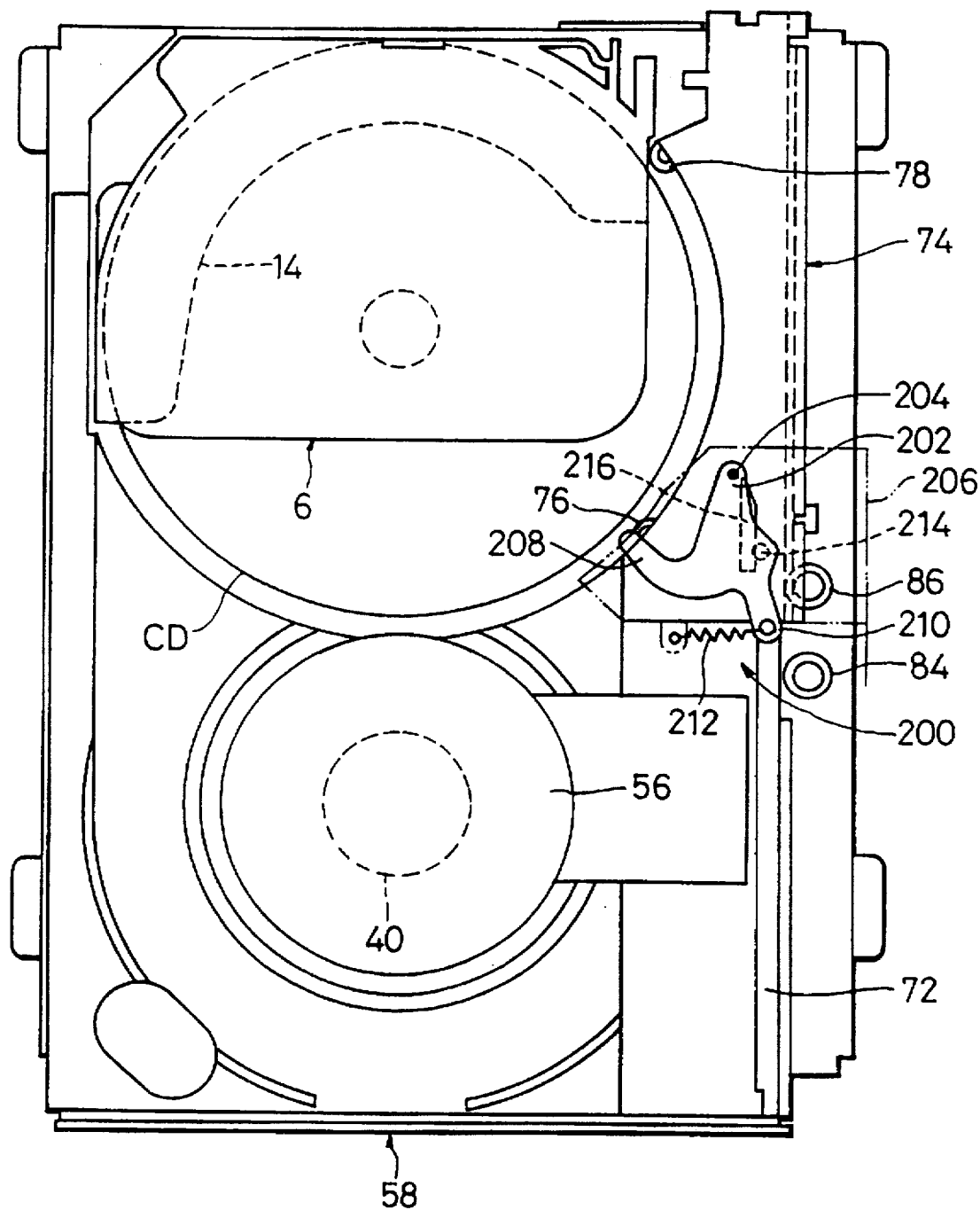
FIG. 19 is a plan view showing still another lifter.
Figure 20:
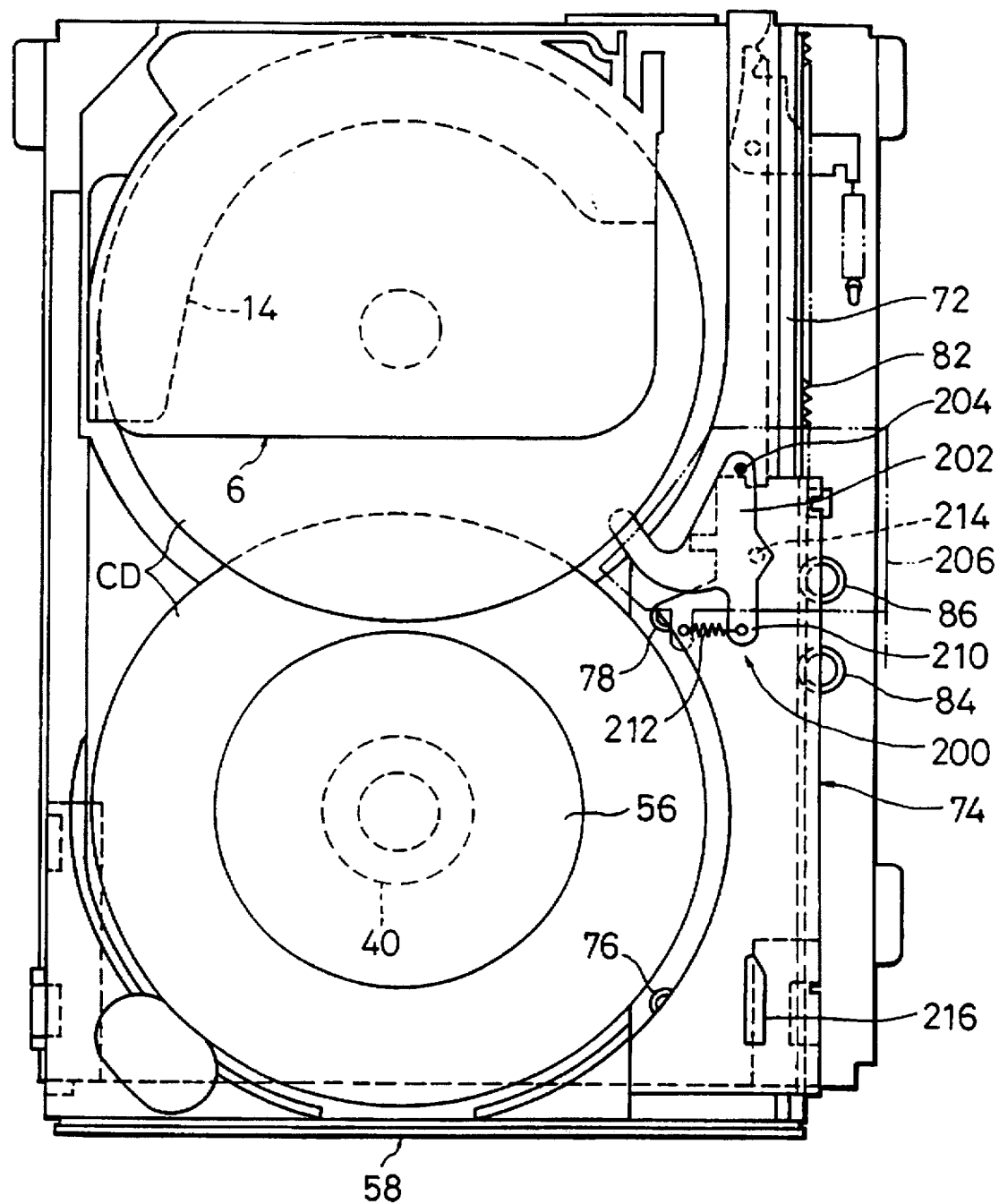
FIG. 20 is a view showing the lifter of FIG. 19 in an operating state.

In this case, as shown in FIGS. 19 and 20, the disk playback apparatus comprises a lifter 200 which operates in association with the reciprocation of the loader 74. The lifter 200 includes a sector plate 202, which is situated in a position corresponding to the middle portion of the guide rail 72 of the pallet 58 and a little higher than the level of the loader 74.

The top portion of the sector plate 202 is directed to the stocker 6, and a support pin 204 protrudes upward from the top portion. The upper end of the pin 204 is rotatably mounted on a cover 206.

Figure 21:
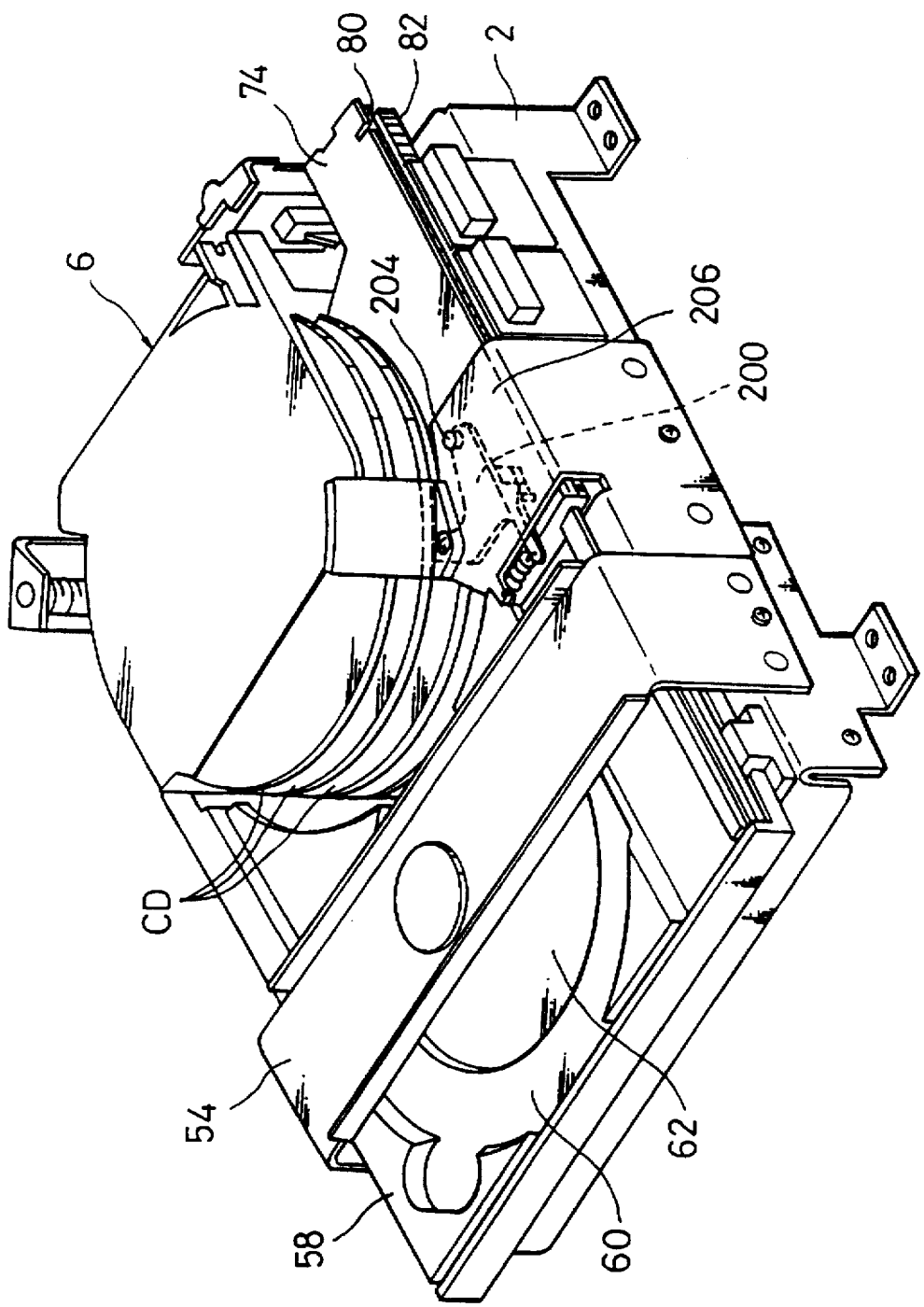
FIG. 21 is a perspective view of a playback apparatus showing an arrangement of the lifter of FIGS. 19 and 20.
Figure 22:
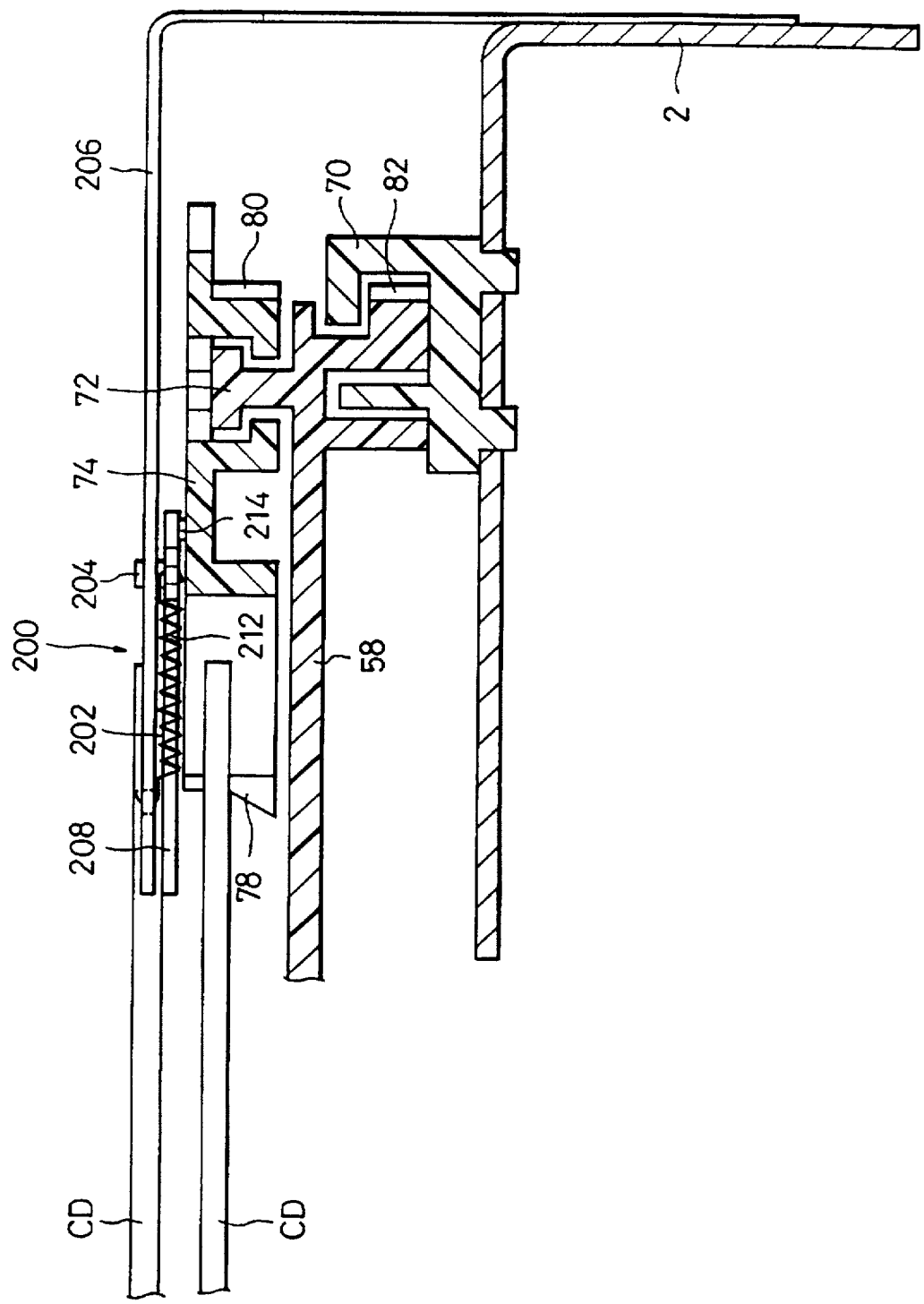
FIG. 22 is a front view showing the lifter of FIG. 19.

The cover 206, which is only indicated by two-dot chain line in FIGS. 19 and 20, are definitely shown in FIGS. 21 and 22. The cover 206 is fixed to a side face of the main chassis 2, and overhangs that region of the pallet 58 over which the loader 74 reciprocates.

A lifting claw 208 extends from one side edge of the sector plate 202 toward the stocker 6, and its distal end is wedge-shaped. The distal end of the claw 208 is situated on the same level with the shelf 14 of the stocker 6 directly over the selected shelf.

An arm 210 protrudes from an arcuate edge of the sector plate 202, and a tension coil spring 212 is stretched between the arm 210 and the cover 206. Referring to FIGS. 19 and 20, the spring 212 urges the sector plate 202 to rotate in the clockwise direction around the support pin 204.

Further, a circular protrusion 214 is formed on the lower surface of the sector plate 202, while a projection 216 capable of engaging the protrusion 214 is formed integrally on the upper surface of the loader 74. The projection 216 is located at that end portion of the loader 74 which is situated remote from the stocker 6, and extends for predetermined length toward the stocker 6. The stocker-side end of the projection 216 is wedge-shaped.

When the loader 74 is in the loading position, as shown in FIG. 20, its projection 216 is kept remote from the sector plate 202. In this case, the plate 202 is urged to rotate in the clockwise direction around the support pin 204 by the tension coil spring 212. Accordingly, the lifting claw 208 of the sector plate 202 projects into a CD storage region on the stocker side.

As the loader 74 is moved from the loading position shown in FIG. 20 to the unloading position shown in FIG. 19, on the other hand, its projection 216 engages the protrusion 214 of the sector plate 202 from inside, thereby pushing the protrusion 214 outward. Accordingly, the sector plate 202 is rotate in the counterclockwise direction against the urging force of the tension coil spring 212, and its lifting claw 208 is retreated from the CD storage region.

Figure 23:
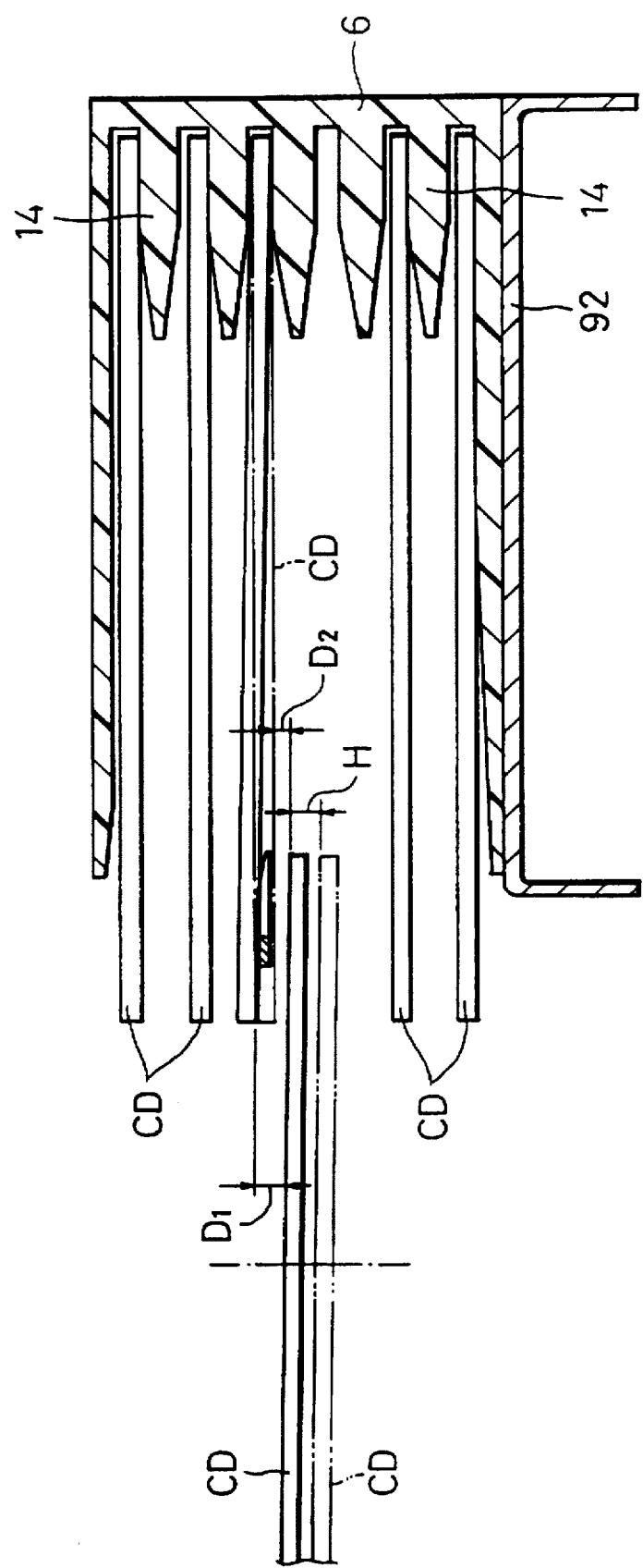
FIG. 23 is a view illustrating the action of the lifter of FIG. 19.

Referring to FIG. 23, there is shown the relative positions of the playback CD and the concerned CD stored on the shelf 14 directly over the selected shelf 14s during the CD playback operation. In FIG. 23, the CD drawn out from the selected shelf 14 of the stocker 6 onto the pallet 58 is indicated by two-dot chain line, and the playback CD indicated by full line is clamped in a position higher than the position of the CD indicated by two-dot chain line by a margin H. Thus, the playback CD approaches the concerned CD in the stocker 6.

Since the loader 74 is in the loading position at this time, however, the lifting claw 208 of the sector plate 202 projects toward the stocker 6, as mentioned before. Since the plate 202 is on the same level with the shelf 14 for the concerned CD, moreover, the distal end of the lifting claw 208 gets under the concerned CD, thereby picking up its peripheral edge. In FIG. 23, dashed line indicates the concerned CD stored in its original position.

Accordingly, a gap $D_1$ between the concerned CD indicated by full line and the playback CD is wider than a gap $D_2$ between the concerned CD indicated by dashed line and the playback CD. Thus, even though the individual CDs are subject to substantial variations in thickness and warp, which are accompanied with sag of the concerned CD attributable to errors in the molding and assembling accuracies, a satisfactory gap can be secured between the playback CD and the concerned CD, so that these two CDs can be securely prevented from coming into contact with each other.

Thereafter, the playback CD is returned to the pallet 58, as mentioned before, and is pushed back from the pallet 58 into the empty selected shelf 14 of the stocker 6, that is, the loader 74 is moved to the unloading position shown in FIG. 19. Thereupon, the lifting claw 208 of the sector plate 202 is retreated from the CD storage region on the stocker side, so that it never hinders the ascent and descent of the stocker 6.

Figure 24:
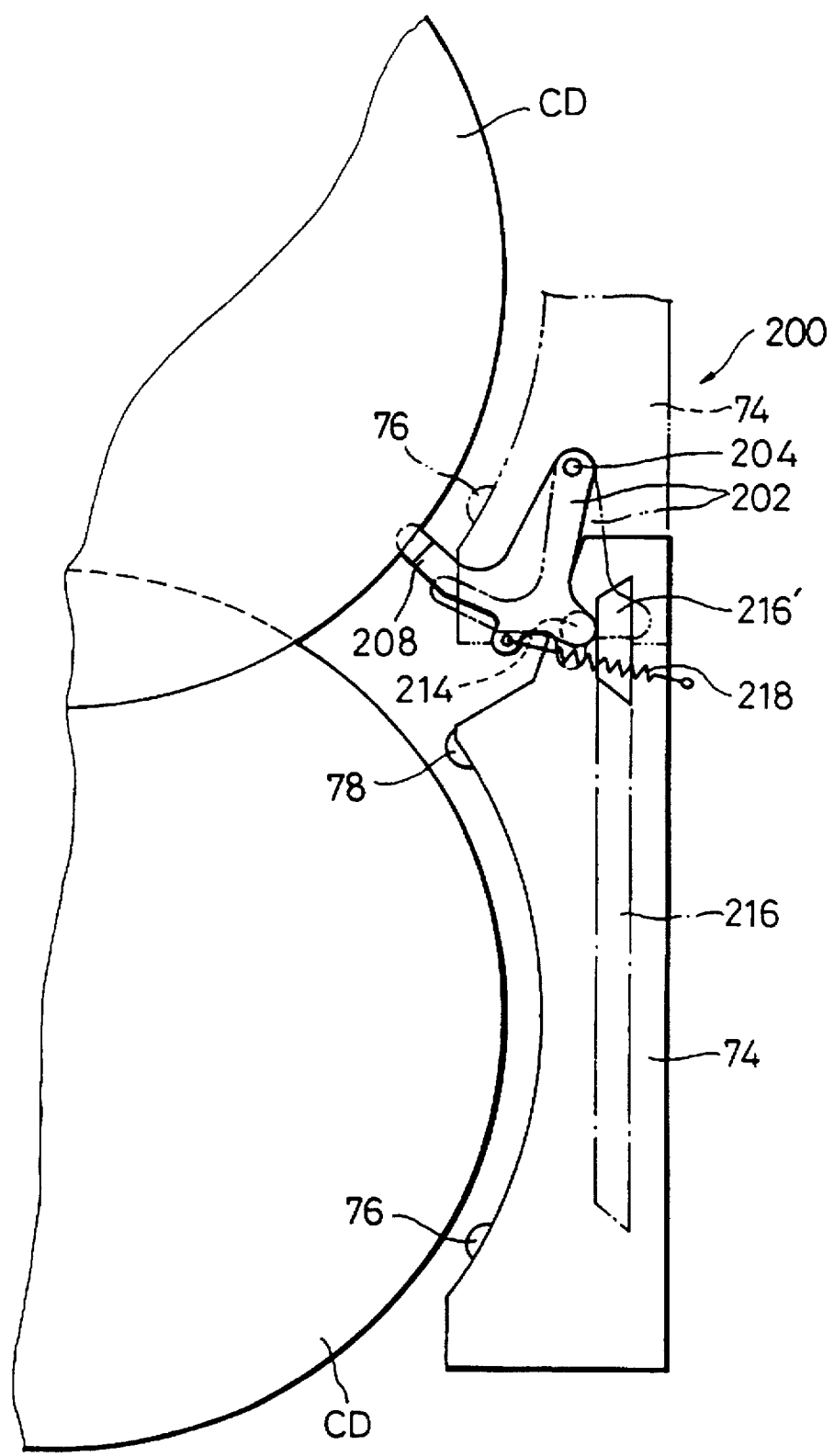
FIG. 24 is a view showing a modification of the lifter of FIG. 19.

The lifter 200 shown in FIG. 24 has a tension coil spring 218 for the sector plate 202 in place of the tension coil spring 211. The coil spring 218 is located on the side opposite to the aforementioned tension coil spring 212. In this case, a projection 216' is located at the stocker-side end portion of the loader 74, and both ends thereof are wedge-shape.

When the loader 74 is in the loading position indicated by full line in FIG. 24, the projection 216' engages the protrusion 214 of the sector plate 202 from outside, thereby pushing the protrusion 214 inward. Accordingly, the sector plate 202 is rotated in the clockwise direction of FIG. 24 against the urging force of the tension coil spring 218. At this time, the lifting claw 208 of the plate 202 gets under the concerned CD in the stocker 6, thereby lifting its peripheral edge.

When the loader 74 is moved toward the unloading position indicated by two-dot chain line, the projection 216' leaves the protrusion 214 of the sector plate 202. Thus, the plate 202 is urged to rotate in the counterclockwise direction, as indicated by two-dot chain line in FIG. 24, by the tension coil spring 218, so that the lifting claw 208 recedes from the CD storage region.

According to the lifter 200 shown in FIG. 24, the peripheral edge of the concerned CD is lifted by the lifting claw 208 of the sector plate 202 when the loader 74 reaches the loading position.

The peripheral edge of the concerned CD may, however, be kept lifted during the movement of the loader 74 from the loading position to the unloading position, as well as when the loader 74 is in the loading position. To attain this, it is necessary only to extend the projection 216' in the lengthwise direction of the loader 74.

Figure 25:
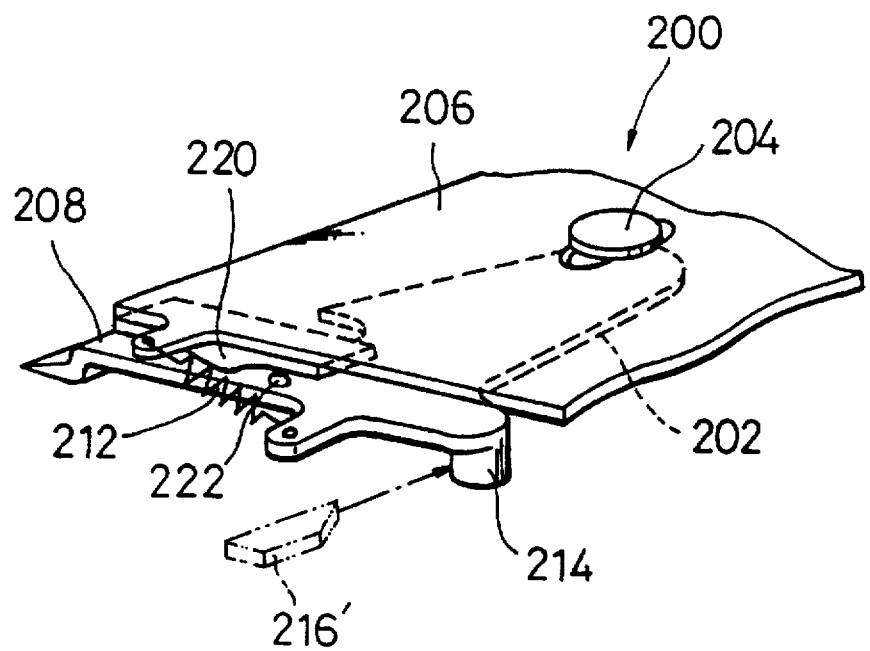
FIG. 25 is a perspective view showing another modification of the lifter of FIG. 19.
Figure 26:
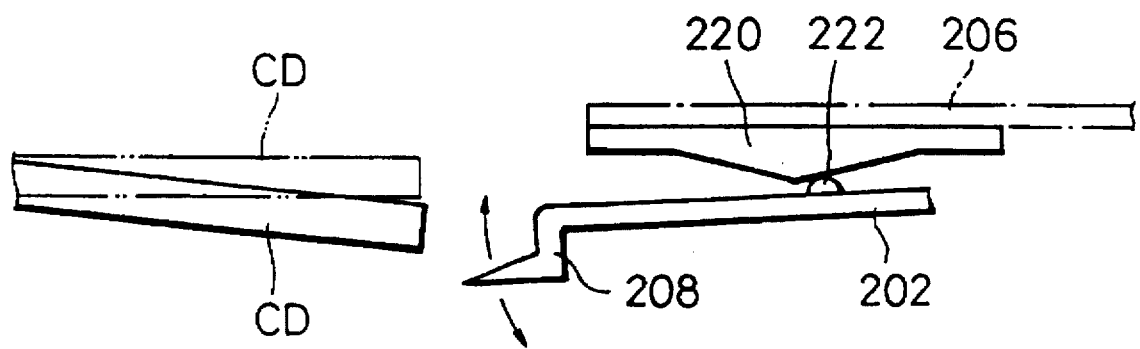
FIG. 26 is a view illustrating the action of the lifter of FIG. 25.

Referring to FIGS. 25 and 26, there is shown another modification of the lifter 200. The lifter 200 according to this modification includes a cam assembly besides the sector plate 202 shown in FIG. 19. The cam assembly includes a face cam 220, which is mounted on the lower surface of the cover 206. The face cam 220 has a downward cam face which extends in the rotating direction of the sector plate 202, and whose central portion projects downward. Formed on the upper surface of the plate 202 is a hemispherical cam follower 222 which cooperates with the face cam 220.

In the case of the lifter 200 of this modification, the cam follower 222 slides on the cam face of the face cam 220 as the sector plate 202 rotates toward the concerned CD, as shown in FIG. 26. In doing this, the sector plate 202 or its lifting claw 208 can get under the concerned CD after being pressed down.

Thus, even though the peripheral edge of the concerned CD is downwardly warped, as indicated by full line in FIG. 26, the lifting claw 208 can get under the concerned CD without running against the peripheral edge of the concerned CD, and can securely lift the peripheral edge.

In the case of the lifter 200 shown in FIG. 25, a through hole for the support pin 204 is a slot which allows the sector plate 202 to be pressed down.

Figure 27:
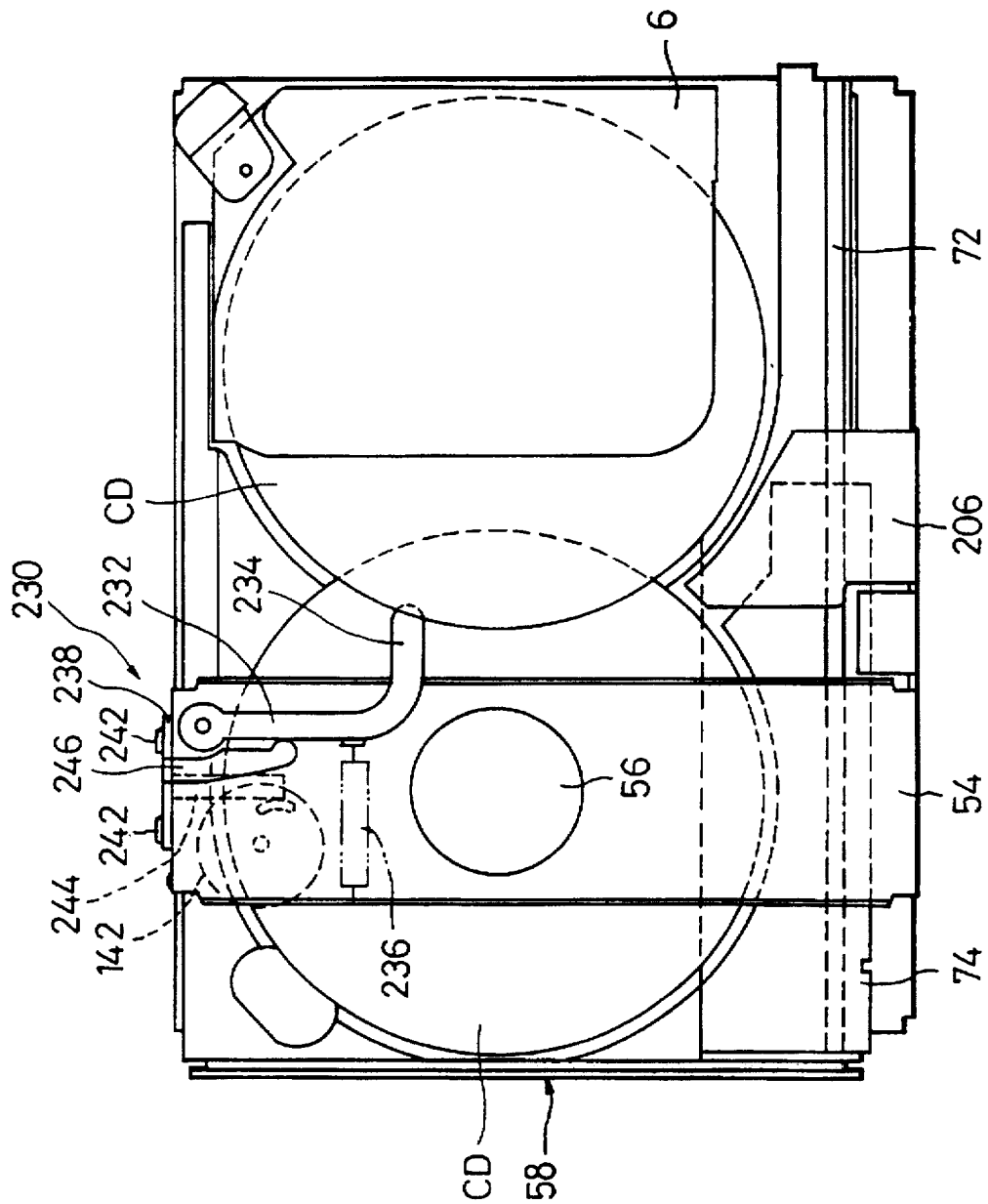
FIG. 27 is a plan view showing a further lifter.

The lifters 200 shown in FIGS. 19, 24 and 25 operate in association with the movement of the loader 74. Referring to FIG. 27, there is shown a lifter 230 which operates in association with the rocking motion of the playback unit 20.

The lifter 230 includes a lifter arm 232 which corresponds to the sector plate 202. The arm 232 is located on that end portion of the upper surface of the cross plate 54 which is remoter from the loader 74. The arm 232, having its proximal end rotatably supported on the cross plate 54, extends along the plate 54. The distal end portion of the arm 232 is formed as a lifting claw 234 which is bent toward the stocker 6.

A tension coil spring 236 is stretched between the arm 232 and the cross plate 54. The spring 236 urges the arm 232 to rotate in a direction such that the lifting claw 234 of the arm 232 moves away from the stocker 6.

Figure 28:
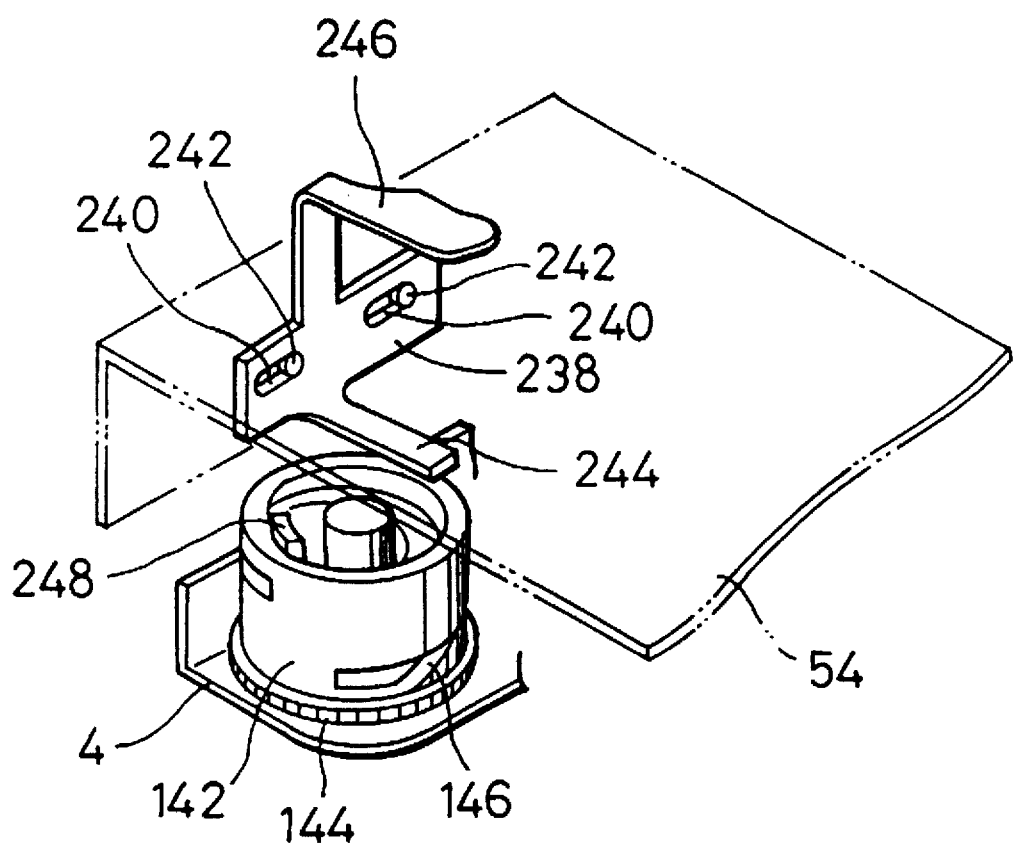
FIG. 28 is a perspective view showing part of the lifter of FIG. 27.

On the other hand, a sliding plate 238 is provided on the outside of the downwardly bent end portion of the cross plate 54 which is situated on the arm side and fixed to the main chassis 2. As shown in FIG. 28, the plate 238 has a pair of slots 240, which are penetrated by pins 242, individually. The pins 242 protrude from the bent end portion of the cross plate 54. Thus, the sliding plate 238 is mounted on the bent end portion of the plate 54 by means of the pair of pins 242 so as to be slidable in the same direction as the moving direction of the loader 74.

An engaging arm 244 protrudes from the lower end edge of the sliding plate 238. The arm 244, which extends toward the inside of the main chassis 2, is located over the cylindrical cam 142. Also, a driving arm 246 protrudes from the upper end edge of the plate 238. The arm 246 first extends upward, and is then bent along the upper surface of the cross plate 54. The distal end of/the driving arm 246 abuts against the lifter arm 232 on the side opposite to the lifting claw 234.

A pusher 248 protrudes from the upper surface of the cylindrical cam 142. When the playback unit 20 is not rocked upward, the pusher 248 of the cam 142 is situated at a great distance from the engaging arm 244 of the sliding plate 238, as shown in FIG. 28. At this time, the plate 238 is urged to move toward the cylindrical cam 142 by the lifter arm 232.

When the playback unit 20 is rocked upward from this position so that the CD to be played is clamped on the turntable, 40, that is, when the cylindrical cam 142 is rotated, the pusher 248 of the cam 142 abuts against the engaging arm 244 of the sliding plate 238, thereby moving the plate 238 away from the cam 142 or toward the stocker 6. As the sliding plate 238 moves in this manner, its driving arm 246 rotates the lifter arm 232 toward the stocker 6, resisting the urging force of the tension coil spring 236.

As shown in FIG. 27, therefore, the lifting claw 234 of the lifter arm 232 gets under the concerned CD stored in the stocker 6, thereby lifting up the peripheral edge of this CD. As a result, the gap between the playback CD on the turntable 40 and the concerned CD is increased, so that these CDs can be securely prevented from coming into contact with each other.

According to the disk playback apparatuses of the embodiments described above, the gap between the playback CD and the concerned CD in the stocker 6 is increased by situating the selected shelf 14 above the pallet 58 or directly lifting up the peripheral edge of the concerned CD during the CD playback operation.

In a modification which will be described below, however, the gap between the playback CD and the concerned CD can be increased without using any of the aforementioned lifters 77, 123, 200 and 230.

Figure 29:
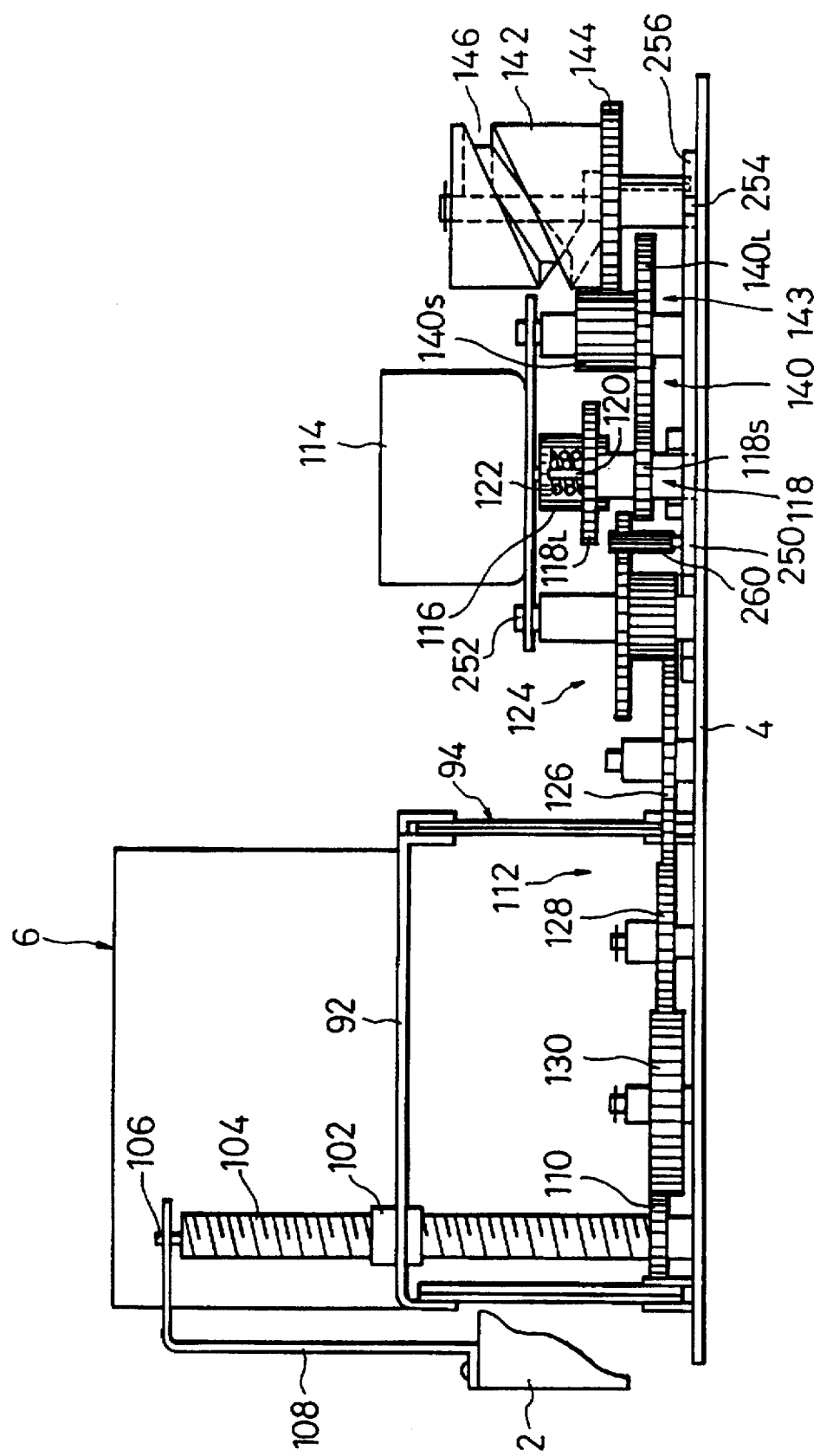
FIG. 29 is a view showing another power transmission system for the stocker and the playback unit.

FIG. 29 shows another power transmission system for the stocker 6 and the playback unit 20. The system is furnished with a plastic power distributing lever 250. The lever 250 is located on the sub-chassis 4, and is rotatably mounted on a support shaft 252 of the stepped gear assembly 124.

Figure 30:
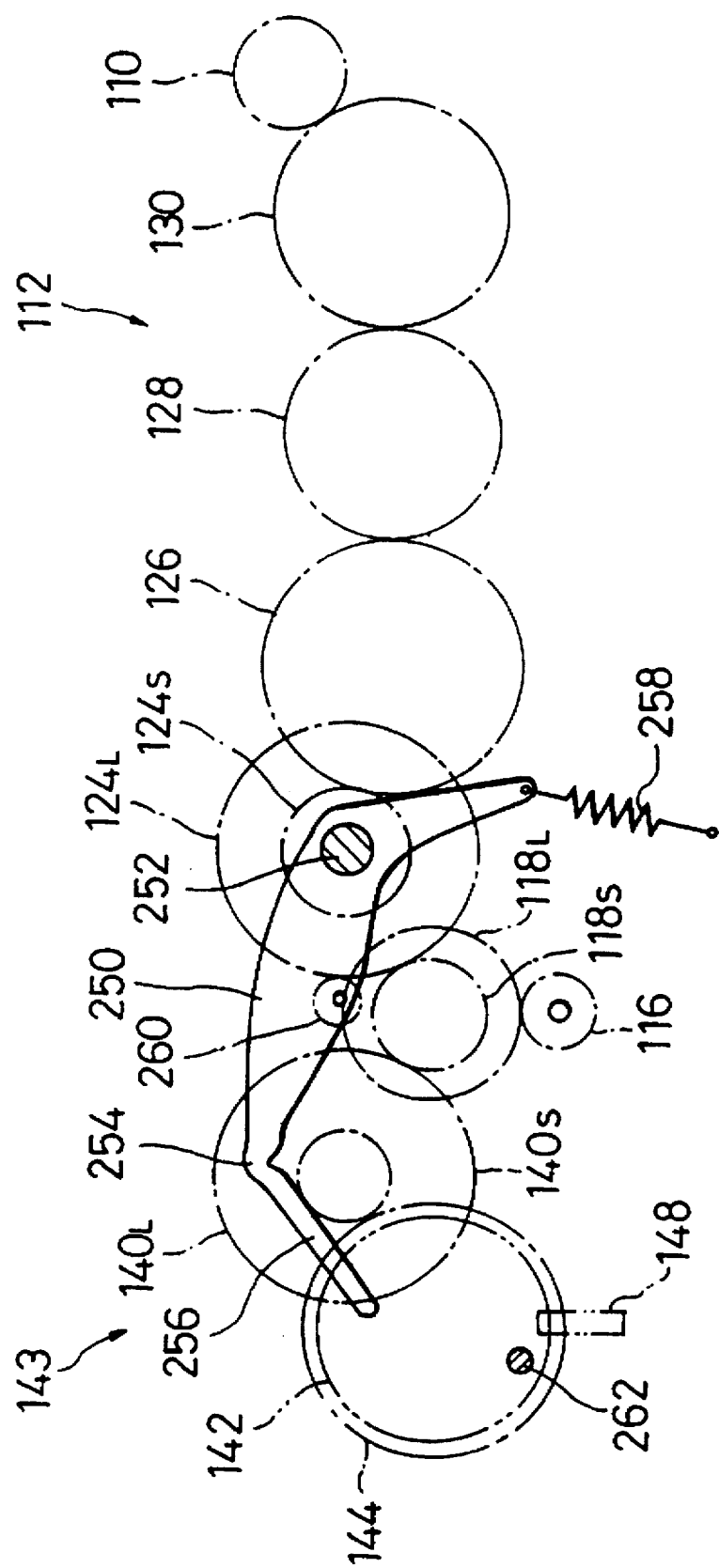
FIG. 30 is a plan view showing a power distributing lever included in the power transmission system of FIG. 29.

As seen from FIG. 30, one end side of the lever 250 extends from the support shaft 252 toward the cylindrical cam 142, and one end portion thereof is bent at a flexible portion 254, and gets under the gear 144 of the cam 142. The one end portion of the lever 250 is formed as a leaf spring 256, which can bend toward the inside of the sub-chassis 4 as the flexible portion 254 is elastically deformed.

The other end side of the lever 250 extends from the support shaft 252 toward the inside of the sub-chassis 4, and a tension coil spring 258 is stretched between the other end of the lever 250 and the sub-chassis 4. The spring 258 urges lever 250 to rotate in the clockwise direction of FIG. 30. The spring constant of the coil spring 258 is smaller enough than that of the leaf spring 256.

A distributing gear 260 is rotatably mounted on the power distributing lever 250. The gear 260 is located in the vicinity of the clutch gear assembly 118, and is in mesh with the large gear $124_L$ of the stepped gear assembly 124. As seen from FIG. 29, the distributing gear 260 extends from the large gear $124_L$ of the gear assembly 124 to the small gear $118_S$ of the clutch gear assembly 118 in the down position.

In the state shown in FIG. 30, the distributing gear 260 is not in mesh with the small gear $118_S$ of the clutch gear assembly 118, and a predetermined gap is secured between the gears 260 and $118_S$.

An engaging pin 262 protrudes from the lower surface of the gear 144 of the cylindrical cam 142 toward the sub-chassis 4. The pin 262 is located on the peripheral edge portion of the gear 144. In the state shown in FIG. 30, the engaging pin 262 is separated from the leaf spring 256 in the circumferential direction of the cylindrical cam 142.

Figure 31:
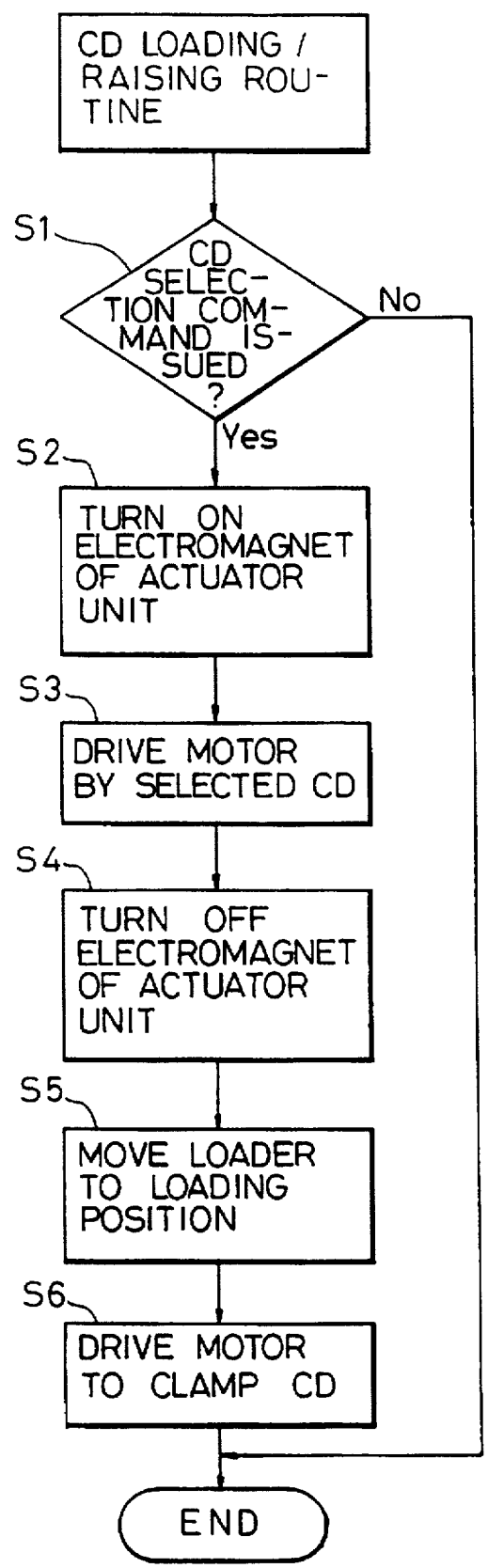
FIG. 31 is a flow chart showing a loading/raising routine for a compact disk.

FIG. 31 shows a CD loading/raising routine including a series of steps which follow the transportation of the CD from the stocker 6 onto the pallet 58 and end with clamping the CD on the turntable 40. The following is a description of this routine.

Loading/Playback Setup Routine

When a selector button (not shown) of the playback apparatus is first depressed so that a selection command for the selection of the CD to be played is supplied, the result of decision in Step S1 becomes YES, whereupon the electromagnet 138 of the actuator unit 132 is excited (Step $2). Accordingly, the unit 132 raises the clutch gear assembly 118, so that the small gear $118_S$ of the gear assembly 118 is caused to engage the large gear $124_L$ of the stepped gear assembly 124 of the gear train 112. In this case, the power from the motor 114 is transmitted to the gear train 112. If the result of decision in Step S1 is NO, this routine is finished without the execution of the subsequent steps.

When Step S2 is executed, the motor 114 is driven to raise or descend the stocker 6, and the selected shelf stage 14 of the stocker 6 is situated on the same level with the pallet 58 (Step S3). At this time, the distributing gear 260 only idles as the stepped gear assembly 124 rotates.

Thereafter, the electromagnet 138 of the actuator unit 132 is de-energized (Step S4), so that the unit 132 causes the clutch gear assembly 118 to descend. Accordingly, the small gear $118_S$ of the gear assembly 118 is caused to engage the large gear $140_L$ of the stepped gear assembly 140 of the other gear train 143. In this case, the power from the motor 114 is allowed to be transmitted to the gear train 143.

When the selected shelf 14 of the stocker 6 is situated on the same level with the pallet 58, the loader 74 moves from the unloading position toward the loading position, as mentioned before, thereby transferring the CD on the selected shelf 14 to the pallet 58 (Step S5). In this case, the loader 74 is provided with none of the lifters 77, 123 and 200.

When the motor 114 is driven, thereafter, its power is transmitted to the cylindrical cam 142 through the gear train 143, so that the cam 142 is rotated. As the cam 142 rotates, the playback unit 20 rocks upward, as mentioned before. AS a result, the CD on the pallet 58 is lifted above the pallet 58 by the turntable 40, and is clamped on the turntable 40 (Step S6), whereupon the CD loading/raising routine is completed.

When the cylindrical cam 142 is rotated for a predetermined rotational angle in the process of execution of Step S6, the engaging pin 262, which protrudes downward from the gear 144 of the cylindrical cam 142, abuts against the leaf spring 256 of the power distributing lever 250, thereby rotating the lever 250 against the urging force of the tension coil spring 258. Since the leaf spring 256 has a spring constant greater than that of the spring 258, as mentioned before, the lever 250 rotates in the direction indicated by the arrow in FIG. 32 around the support shaft 252 of the stepped gear assembly 124 when the engaging pin 262 is pressed against the leaf spring 256.

Figure 32:
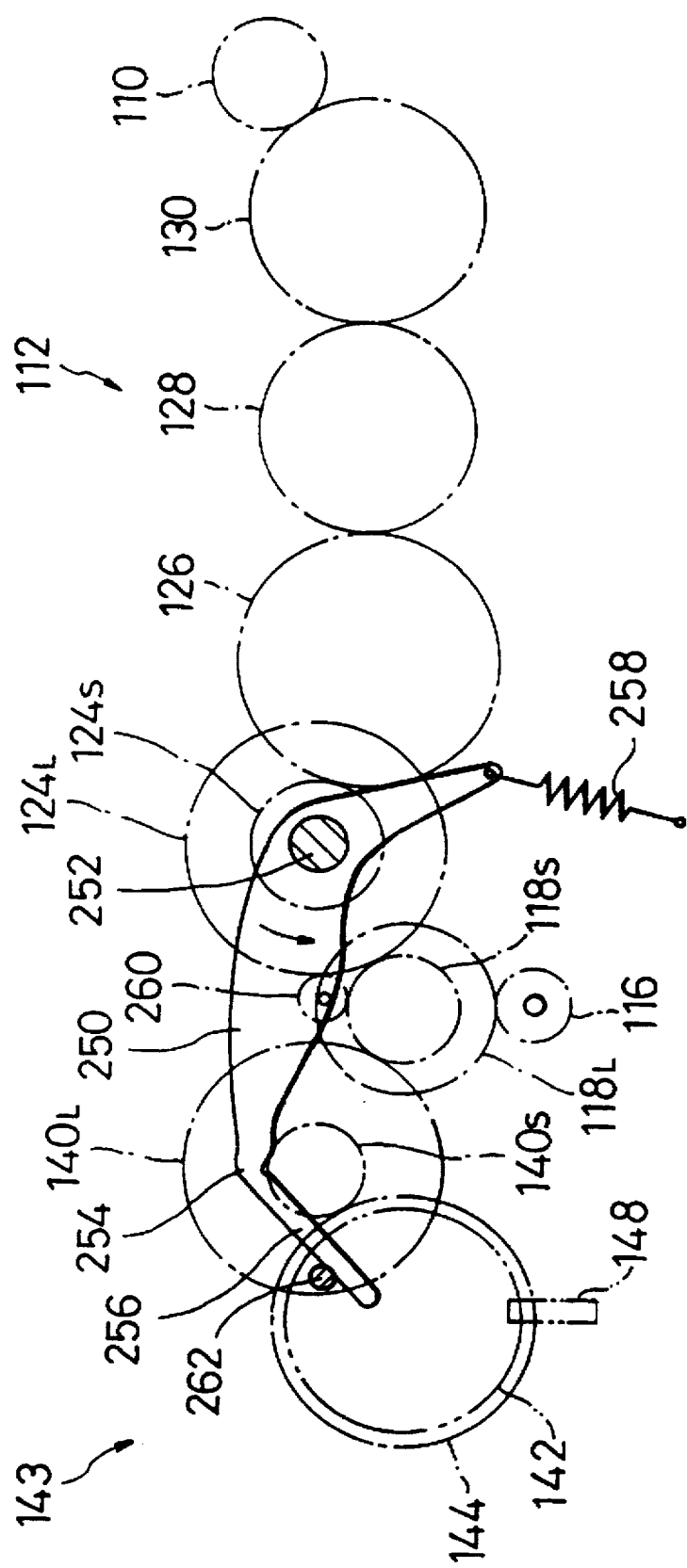
FIGS. 32 and 33 are plan views illustrating the action of the power distributing lever.

As the lever 250 rotates in this manner, the distributing gear 260 moves toward the clutch gear assembly 118 in the condition that the gear 260 is kept in mesh with the large gear $124_L$ of the stepped gear assembly 124. Thereupon, the gear 260 also engages the small gear $118_S$ of the gear assembly 118, as shown in FIG. 32, so that the rotation of the power distributing lever 250 is stopped. At this time, the CD, which ascends together with the turntable 40 of the playback unit 20, is on the edge of being clamped by the clamper 56.

Figure 33:
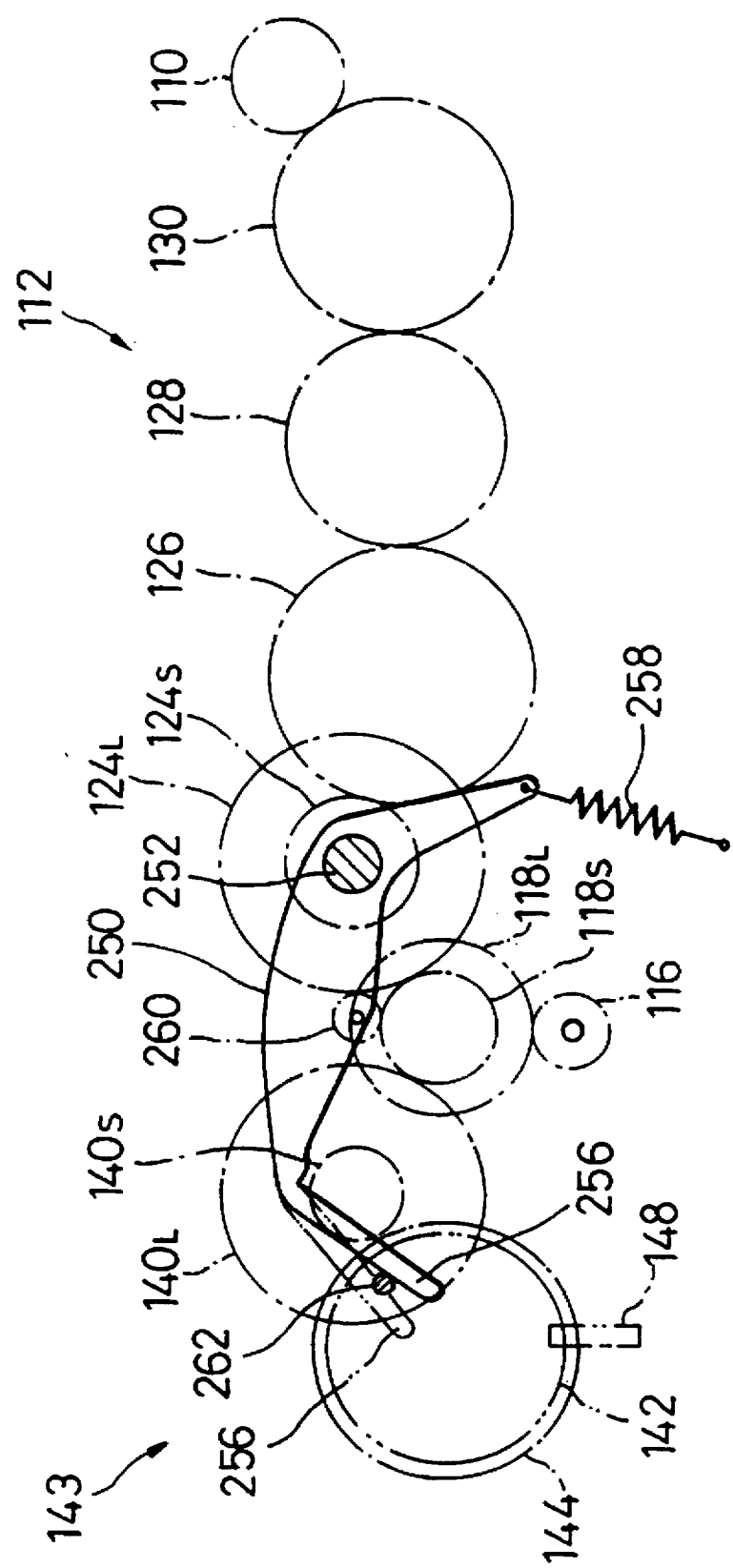

When the cylindrical cam 142 is further rotated for the maximum rotational angle, thereafter, the CD on the turntable 40 is clamped by the clamper 56. As this is done, the engaging pin 256 moves so that the leaf spring 256 of the lever 250 is elastically bent from the state indicated by two-dot chain line to the state indicated by full line, as shown in FIG. 33, and the distributing gear 260 on the lever 250 is kept in mesh with both the large gear $124_L$ of the stepped gear assembly 124 and the small gear $118_S$ of the clutch gear assembly 118.

Thus, during the time interval between the moment immediately before the CD on the turntable 40 is clamped and the time when it is completely clamped, that is, in the final stage of the CD clamping operation, the small gear $118_S$ of the clutch gear assembly 118 engages the stepped gear assembly 124 of the gear train 112, that is, the large gear $124_L$ thereof, through the medium of the distributing gear 260, as well as the stepped gear assembly 140 of the gear train 143. As a result, the power from the motor 114 is transmitted to the feed screw 104 of the stocker 6 through the gear train 112, as well as to the cylindrical cam 142. In this case, the stocker 6 is raised only for a predetermined distance.

Figure 34:
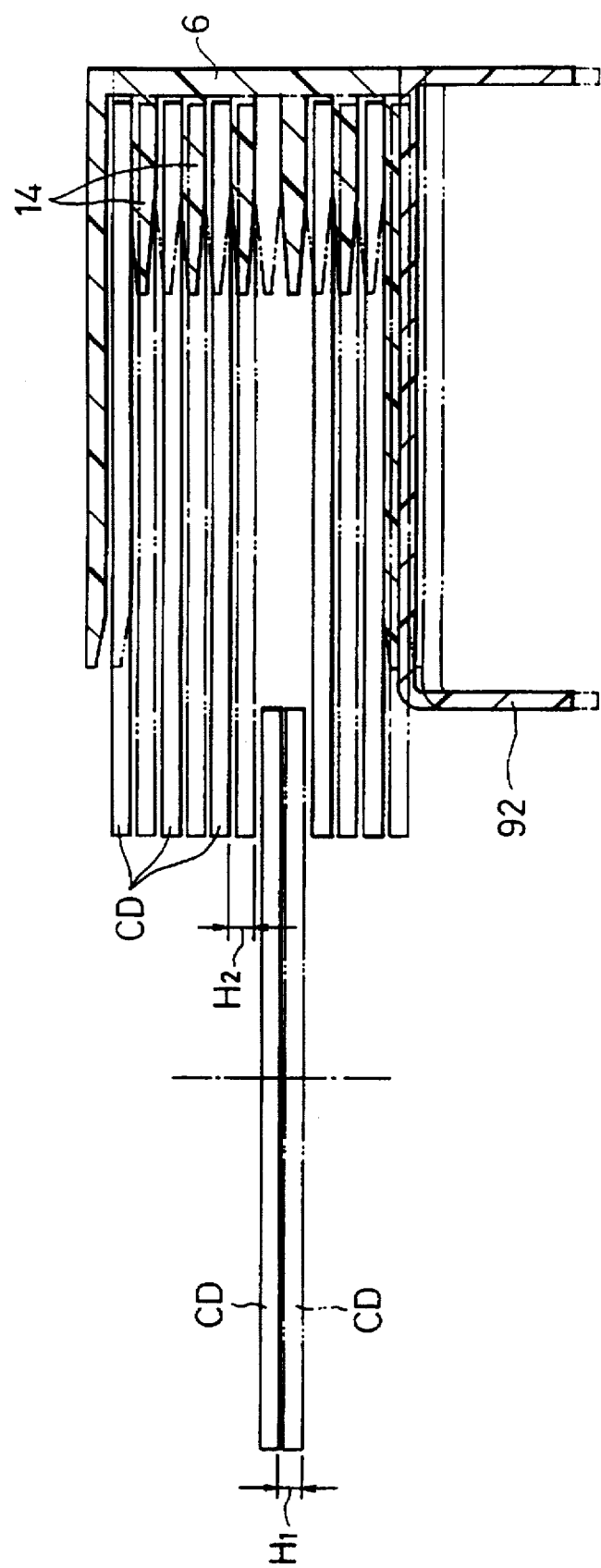
FIG. 34 is a view showing the stocker raised by the agency of the power distributing lever of FIG. 30.

Referring to FIG. 34, there is shown the way the stocker 6 is also raised from a position indicated by two-dot chain line to a position indicated by full line as the CD on the pallet 58 indicated by two-dot chain line is raised to the clamping position indicated by full line by the turntable 40. In FIG. 34, reference numerals $H_1$ and $H_2$ designate the distance between the pallet 58 and the CD clamping position and the lift of the stocker 6, respectively. The lift $H_2$ of the stocker 6 can be freely set within an allowable range which is obtained by adding the CD storage pitch of the stocker 6 and the distance $H_1$.

When the CD playback operation is finished, the cylindrical cam 142 is rotated reversely by means of the motor 114, so that the playback unit 20 rocks downward. Accordingly, the playback CD is returned from the turntable 40 to the pallet 58.

While the engaging pin 262 of the cylindrical cam 142 returns from the position shown in FIG. 33 to the position shown in FIG. 32, the leaf spring 256 of the power distributing lever 250 is only restored to its original position by its elastic restoring force, and the lever 250 never rotates. Thus, the distributing gear 260 on the lever 250 is in mesh with both the clutch gear assembly 118 and the stepped gear assembly 124 of the gear train 112, and the stocker 6 is lowered so that its selected shelf 14 is situated on the same level with the pallet 58.

In the modification described above, the stocker 6 is raised in association with the CD clamping operation. Alternatively, however, the stocker 6 may be raised only for the distance $H_2$ before the CD clamping operation is performed, and more specifically, after the CD is transferred to the pallet 58.

In this case, it is necessary to use a sensor for determining whether or not the CD is on the pallet 58, that is, whether or not the loading position is reached by the loader 74. This sensor has not been definitely described in connection with the foregoing embodiments. The following is a description of an example of the sensor of this type.

Figure 35:
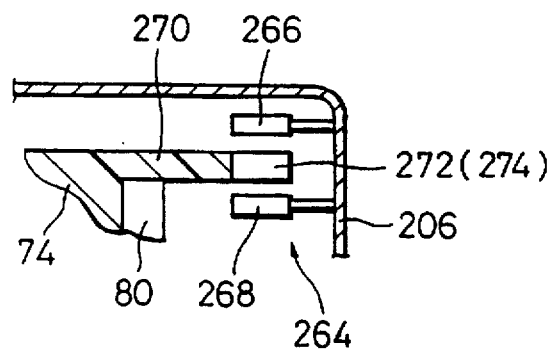
FIG. 35 is a view showing a sensor for detecting the position of the loader.

Referring to FIG. 35, there is shown an optical sensor 264, which includes a light emitting diode 266 and a phototransistor 268. These elements 264 and 268, which are spaced vertically, can be mounted on the aforementioned cover 206 (see FIG. 21).

A rim 270 protrudes integrally from the outside edge of the loader 74. The rim 270 extends between the two opposite ends of the loader 74, and passes between the light emitting diode 266 and the phototransistor 268. The rim 270 is formed having a pair of notches 272 and 274, which are located at one end portion of the rim 270 on the stocker side and the other end portion thereof, respectively.

When the loader 74 is in the loading or unloading position, the notch 272 or 274 is situated between the light emitting diode 266 and the phototransistor 268, and the sensor 264 outputs a detection signal.

Figure 36:
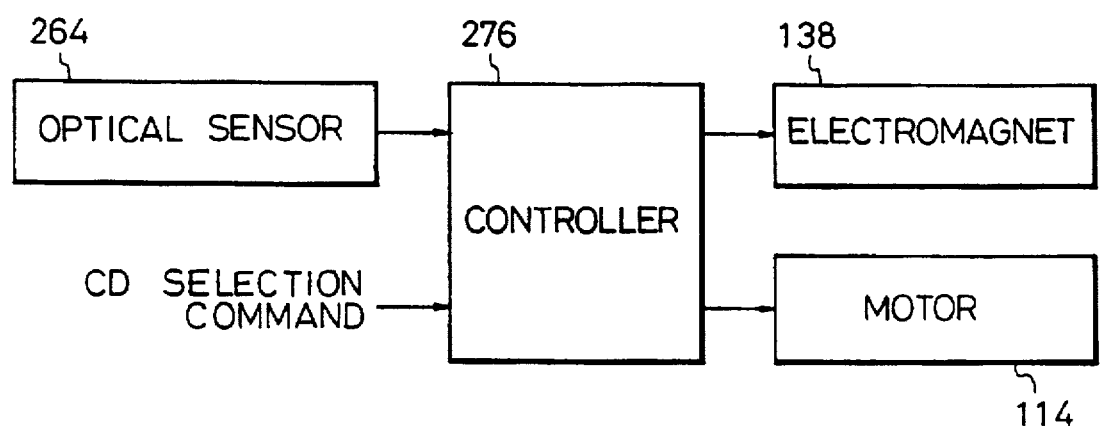
FIG. 36 is a block diagram showing a control circuit of the playback apparatus.

The optical sensor 264, arranged in this manner, is connected electrically to a controller 276, as shown in FIG. 36. The controller 276 controls the motor 114 and the electromagnet 138 of the actuator unit 132 in accordance with the detection signal from the sensor 264.

Figure 37:
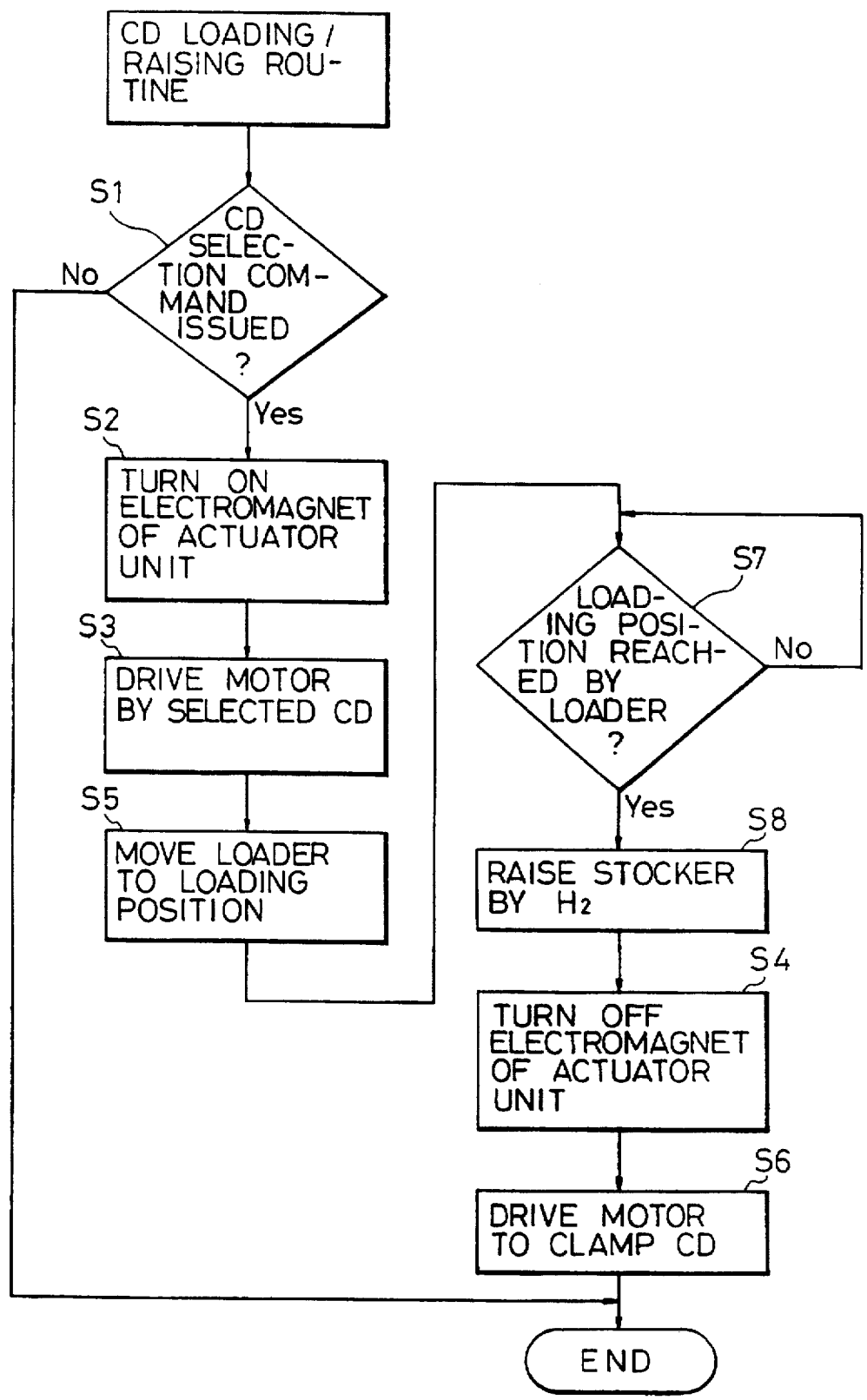
FIG. 37 is a flow chart showing another loading/raising routine executed by the controller of FIG. 36.

FIG. 37 shows a CD loading/raising routine executed by means of the controller 286. In the description to follow with reference to FIG. 37, like reference numerals are used to designate the same steps as the aforementioned ones, and a description of those steps will be omitted.

When Step S3 of this routine is executed, Step S5, not Step S4, is then executed, whereupon the CD is transferred from the stocker 6 to the pallet 58. During the transfer of the CD, therefore, the electromagnet 138 of the actuator unit 132 remains excited, and the unit 132 keeps the small gear $118_S$ of the clutch gear assembly 118 in mesh with the large gear $124_L$ of the stepped gear assembly 124 of the gear train 112.

In the next step or Step S7, the controller 276 determines whether or not the loading position is reached by the loader 74, in accordance with the detection signal from the optical sensor 264. If the result of decision in this step is YES, the controller 276 drives the motor 114, thereby raising the stocker 6 for the distance $H_2$ (Step S8). If the result of decision in Step S7 is NO, this step is repeatedly executed so that the decision result becomes YES.

Thereafter, Steps S4 and S6 are executed in succession, whereupon the CD on the pallet 58 is clamped in the aforesaid manner.

Figure 38:
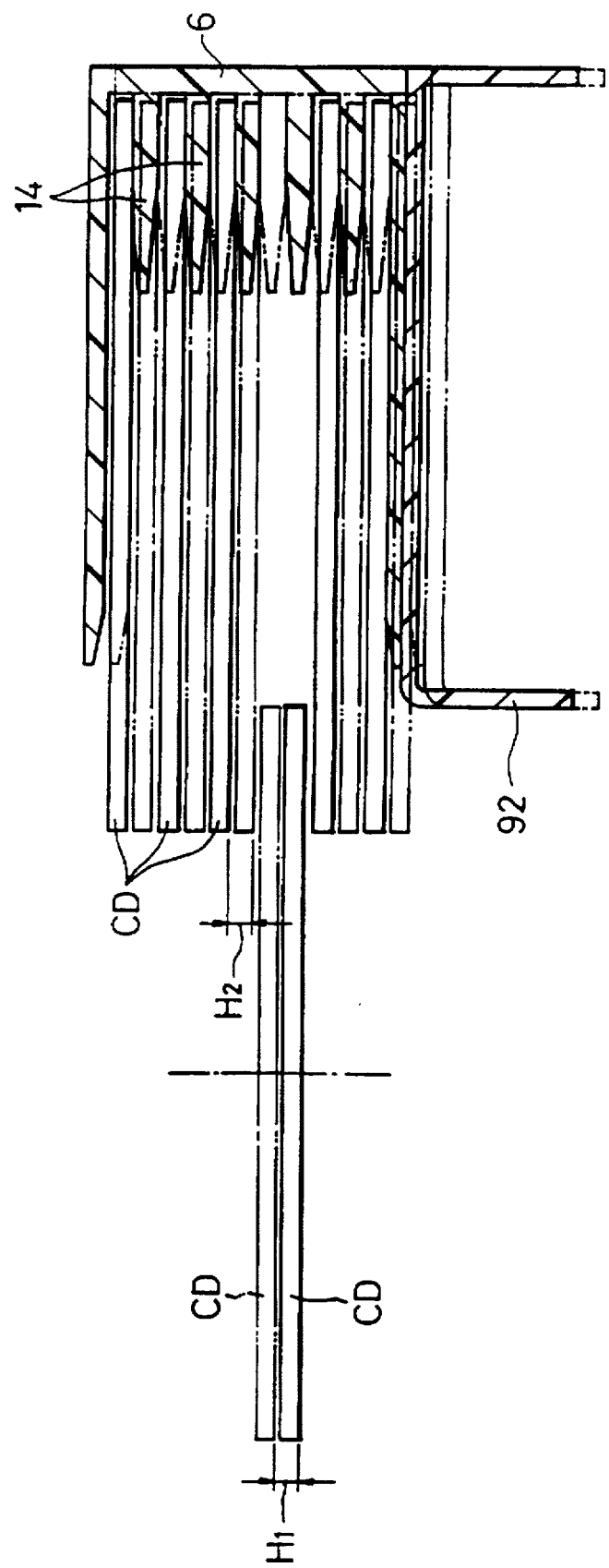
FIG. 38 is a view showing the stocker raised by the agency of the control circuit of FIG. 36.

In the case of this modification, the stocker 6 is previously located in the position indicated by full line in FIG. 38, which is higher than the position indicated by two-dot chain line by the distance $H_2$, when the CD is situated on the pallet 58. Even though the CD is raised for the distance $H_1$ above the pallet 58 by the clamping operation, thereafter, a satisfactory gap can be secured between the playback CD and the concerned CD in the stocker 6.

Different motors may be used to raise or lower the stocker 6 and to rock the playback unit 20. In this case, the stocker 6 is raised for the distance $H_2$ by controlling the motor for the stocker 6 immediately after the loader 74 is located in the loading position or after the CD is clamped.

Furthermore, the position of the loader 74 may be detected by means of an electrical sensor, such as a microswitch, in place of the optical sensor.

Figure 39:
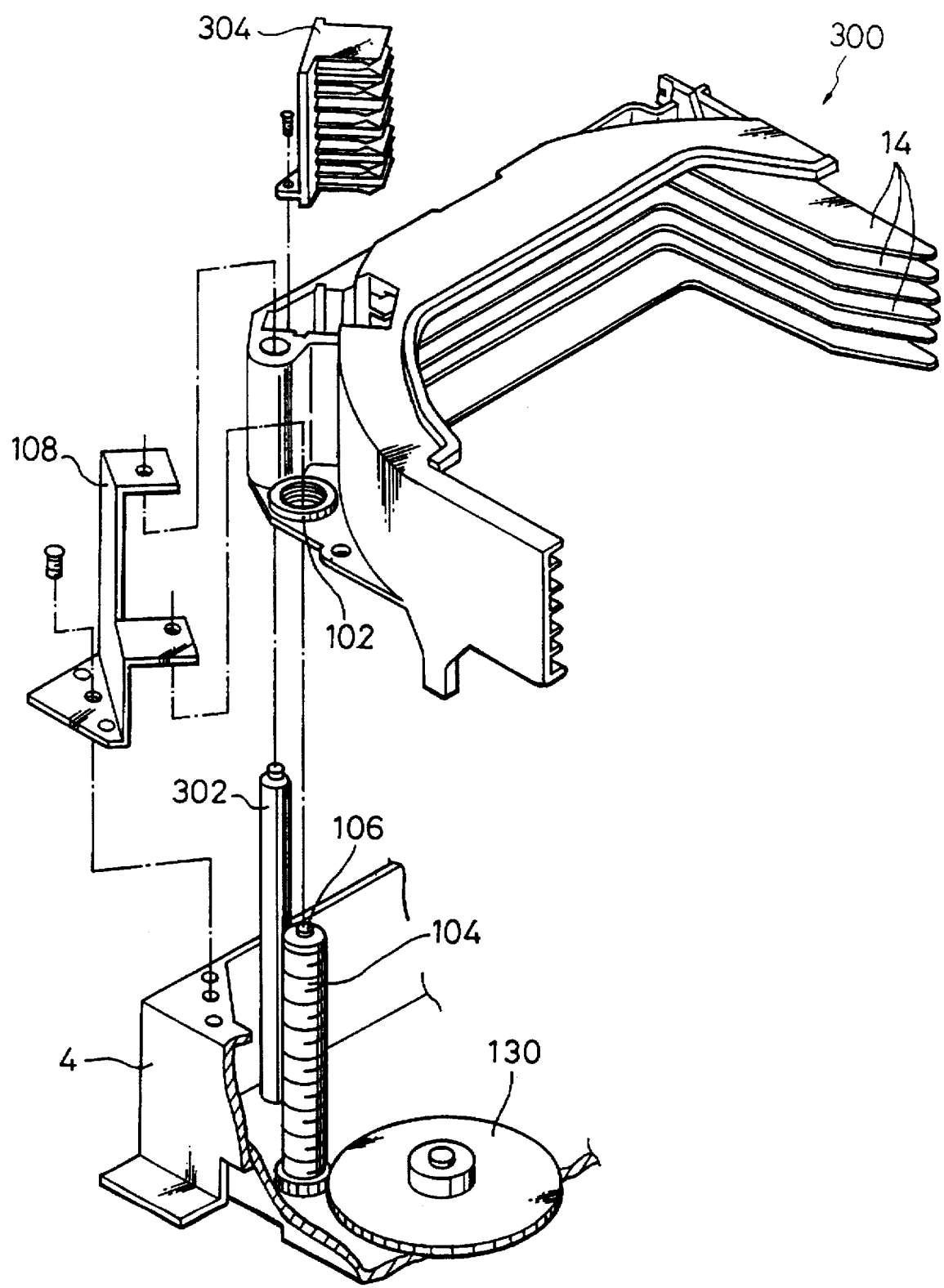
FIG. 39 is a perspective view showing another stocker.

Referring to FIG. 39, there is shown a stocker 300 of another type. A bottom wall and a top wall of the stocker 300 is substantially removed. Further, the stocker 300 is provided with a guide rod 302, which guides the raising or descending of the stocker 300, in place of the pantograph-type support legs 94. In FIG. 39, reference numeral 304 denotes a catcher for holding the peripheral edges of CDs when CDs are received on the shelves 14 of the stocker 300.

What is claimed is:

1. A disk changing apparatus for a disk player comprising:
a stocker for storing disks to be played, said stocker including a plurality of vertically spaced shelves on which the disks are received, and allowing the disks to be drawn out from the shelves, a gap being defined between the disks on adjacent shelves;
a pallet disposed adjacent to said stocker and operatively configured for receiving one of the disks from a selected one of the shelves of said stocker;
raising/lowering means for moving said stocker up and down so that the selected one of the shelves of said stocker is located immediately above said pallet;
loading means for delivering the one disk from the selected one of the shelves of said stocker onto said pallet along a transportation path for the one disk so that the one disk received on said pallet from the selected one shelf of said stocker partially overlaps an adjacent disk on a second shelf directly over the selected one shelf of said stocker with a vertical space which is defined between the one disk on said pallet and the adjacent disk on the second shelf and is wider than the gap,
said loading means including
level changing means for changing the vertical level of one side edge of the one disk while the one disk on the selected one shelf is delivered toward said pallet, the one side edge of the one disk being located at one side of the transportation path of the one disk, and
a slope provided on said pallet, for guiding the other side edge of the one disk while the one disk on the selected one shelf is delivered toward said pallet so that the vertical level of the other side edge is lowered in association with the level change of the one side edge of the one disk by the level changing means, the other side edge being separated from the one side edge in a diametrical direction of the selected one disk; and
clamp means for raising the selected one disk on said pallet to a playback position defined below the second shelf in said stocker and clamping the selected one disk for rotation in the playback position.

2. An apparatus according to claim 1, wherein said loading means includes a guide path extending besides and Between said stocker and said pallet and a loader reciprocating on the guide path between an unloading position on said stocker side and a loading position on said pallet side, the loader being adapted to draw out the selected one disk on the selected one shelf toward said pallet as the loader moves from the unloading position toward the loading position, and being adapted to push back the selected one disk on said pallet toward the selected one shelf as the loader moves from the loading position toward the unloading position; and said level changing means includes supporting means for supporting the one side edge of the selected one disk at a plurality of spots as the loader moves.

3. An apparatus according to claim 2, wherein said supporting means includes a pair of lifting claws housed in the loader and capable of projecting from the loader toward the transportation path for the selected one disk, each of the lifting claws having the shape of a slant-topped wedge and being spaced along the transportation path, and which further includes adjusting means for adjusting a length of projection of the lifting claws from the loader in accordance with a transportation position of the loader, the adjusting means being adapted to cause the lifting claws to project for a first length from the loader so that the lifting claws support the one side edge of the selected one disk on the selected one shelf from below when the loader is located in a position just short of the unloading position, to cause the lifting claws to project for a second length shorter than the first length from the loader so that the lifting claws support the one side edge of the selected one disk on said pallet from below when the loader is located in a position just short of the loading position, to vary the length of projection of the lifting claws from the loader between the first and second lengths so that lifting claws change the vertical level of the one side edge of the selected one disk as the loader is transferred between a position just short of the unloading position and a position just short of the loading position, and to cause the lifting claws to withdraw into the loader when the loader is in the loading and unloading positions, respectively.

4. An apparatus according to claim 3, wherein the adjusting means further includes a pair of levers located in the loader and rotatable in association with each other within a horizontal plane, each of the levers having the lifting claw, a return spring for urging the levers so that the lifting claws are drawn from the loader, and cam means for rotating the levers against the urging force of the return spring in accordance with the transportation position of the loader.

5. An apparatus according to claim 1, wherein said loading means includes a guide path extending beside and between said stocker and said pallet, a shuttle reciprocating on the guide path between an unloading position on said stocker side and a loading position on said pallet side, and a pair of pushers housed in the shuttle and capable of projecting from the shuttle toward the transportation path for the selected one disk in association with the reciprocation of the shuttle, each of the pushers being adapted to project from the shuttle to hold the one side edge of the one disk on the selected one shelf and draw out the selected one disk from the selected one shelf toward said pallet as the shuttle moves from the unloading position toward the loading position, and being adapted to project from the shuttle to hold the one side edge of the selected one disk on said pallet and push back the selected one disk from said pallet toward the selected one shelf as the shuttle moves from the loading position toward the unloading position; and said level changing means includes moving means for moving the pushers in a vertical direction as the selected one disk is transferred between the selected one shelf and said pallet.

6. An apparatus according to claim 5, wherein said loading means further includes a pair of levers located in the shuttle and rotatably in association with each other within a horizontal plane, lifting claws as the pushers being connected to the levers by means of hinges, individually, and rotatable in the vertical direction, and first cam means for rotating the levers so as to cause the lifting claws to project from the shuttle as the shuttle is transferred between the loading position and the unloading position; the moving means includes second cam means for changing a vertical position of the lifting claws on the levers as the levers rotate, the second cam means being adapted to locate the lifting claws in an up position on the same level with the selected one disk on the selected one shelf when the shuttle is located in a position just short of the unloading position, to locate the lifting claws in a down position on the same level with the selected one disk on said pallet when the shuttle is located in a position just short of the loading position, and to vary the level of the lifting claws between the up and down positions as the shuttle is transferred between the position just short of the unloading position and the position of just short of the loading position.

* * * * *